(12) United States Patent
Imamura et al.

(10) Patent No.: US 8,393,995 B2
(45) Date of Patent: Mar. 12, 2013

(54) CONTROL DEVICE FOR HYBRID VEHICLE POWER TRANSMITTING APPARATUS

(75) Inventors: Tatsuya Imamura, Okazaki (JP); Yuji Iwase, Mishima (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 463 days.

(21) Appl. No.: 12/670,013

(22) PCT Filed: Jul. 30, 2008

(86) PCT No.: PCT/JP2008/064078
§ 371 (c)(1),
(2), (4) Date: Jan. 21, 2010

(87) PCT Pub. No.: WO2009/022588
PCT Pub. Date: Feb. 19, 2009

(65) Prior Publication Data
US 2010/0197449 A1    Aug. 5, 2010

(30) Foreign Application Priority Data
Aug. 10, 2007  (JP) ................................ 2007-210467

(51) Int. Cl.
*B60K 1/02* (2006.01)
*B60W 10/04* (2006.01)

(52) U.S. Cl. ........................ 477/3; 180/65.285

(58) Field of Classification Search ................ 477/3, 98; 475/5; 180/65.285
See application file for complete search history.

(56) References Cited

U.S. PATENT DOCUMENTS

| | | | |
|---|---|---|---|
| 6,237,709 B1 | 5/2001 | Chubachi | |
| 6,915,782 B2 * | 7/2005 | Hanada et al. | 123/399 |
| 6,965,824 B2 * | 11/2005 | Ichimoto et al. | 701/113 |
| 7,465,251 B2 * | 12/2008 | Zhang | 477/5 |
| 7,618,343 B2 * | 11/2009 | Tabata et al. | 477/3 |

(Continued)

FOREIGN PATENT DOCUMENTS

| | | |
|---|---|---|
| DE | 10 2005 008 156 A1 | 9/2006 |
| EP | 1 143 134 A1 | 10/2001 |

(Continued)

OTHER PUBLICATIONS

Jan. 17, 2012 Office Action issued in Japanese Patent Application No. 2007-210467 (with partial translation).

(Continued)

*Primary Examiner* — Roger Pang
(74) *Attorney, Agent, or Firm* — Oliff & Berridge, PLC

(57) ABSTRACT

A control device is provided for a hybrid vehicle power transmitting apparatus wherein when a fuel type supplied to an engine is altered, a drop in startability of the engine resulting from alteration on the fuel type is suppressed. Fuel-type determining means determines the fuel type for use in operating the engine, based on which a reactive control representing a control of reactive control of a second electric motor counteracting rotational resistance of the engine during engine startup, is altered. Accordingly, second-motor torque (reactive torque) for increasing an engine rotation speed during engine startup is adjusted depending on the fuel type, thereby increasing a temperature of fuel compressed and expanded in the engine, to a level available to initiate an ignition. This prevents the alteration of the fuel type from causing degradation in startability of the engine when the fuel type supplied to the engine is altered.

19 Claims, 12 Drawing Sheets

U.S. PATENT DOCUMENTS

| | | | |
|---|---|---|---|
| 2005/0082097 A1 | 4/2005 | Ichimoto et al. | |
| 2010/0138086 A1* | 6/2010 | Imamura et al. | 701/22 |

FOREIGN PATENT DOCUMENTS

| | | |
|---|---|---|
| EP | 1 413 726 A2 | 4/2004 |
| EP | 1 526 020 A2 | 4/2005 |
| EP | 1 669 578 A1 | 6/2006 |
| JP | A-9-170533 | 9/1997 |
| JP | A-2000-238555 | 9/2000 |
| JP | A-2002-204503 | 7/2002 |
| JP | A-2005-6406 | 1/2005 |
| JP | A-2005-264762 | 9/2005 |
| JP | A-2007-196908 | 8/2007 |

OTHER PUBLICATIONS

International Search Report issued in International Application No. PCT/JP2008/064078, mailed Oct. 7, 2008.

International Preliminary Report on Patentability issued in International Application No. PCT/JP2008/064078, issued on Oct. 14, 2009.

Written Opinion of the International Searching Authority issued in International Application No. PCT/JP2008/064078 issued on Oct. 7, 2008.

Office Action dated May 3, 2012 from Chinese Patent Application No. 200880102839.9 (with translation).

* cited by examiner

| | C0 | C1 | C2 | B0 | B1 | B2 | B3 | SHIFTING RATIO | STEP |
|---|---|---|---|---|---|---|---|---|---|
| 1st | ◎ | ○ | | | | | ○ | 3.357 | 1.54 |
| 2nd | ◎ | ○ | | | | ○ | | 2.180 | 1.53 |
| 3rd | ◎ | ○ | | | ○ | | | 1.424 | 1.42 |
| 4th | ◎ | ○ | ○ | | | | | 1.000 | 1.42 |
| 5th | | ○ | ○ | ◎ | | | | 0.705 | TOTAL 4.76 |
| R | | | ○ | | | | ○ | 3.209 | |
| N | | | | | | | | | |

○ ENGAGED
◎ ENGAGED UPON STEP-VARIABLE
  RELEASED UPON CONTINUOUSLY-VARIABLE

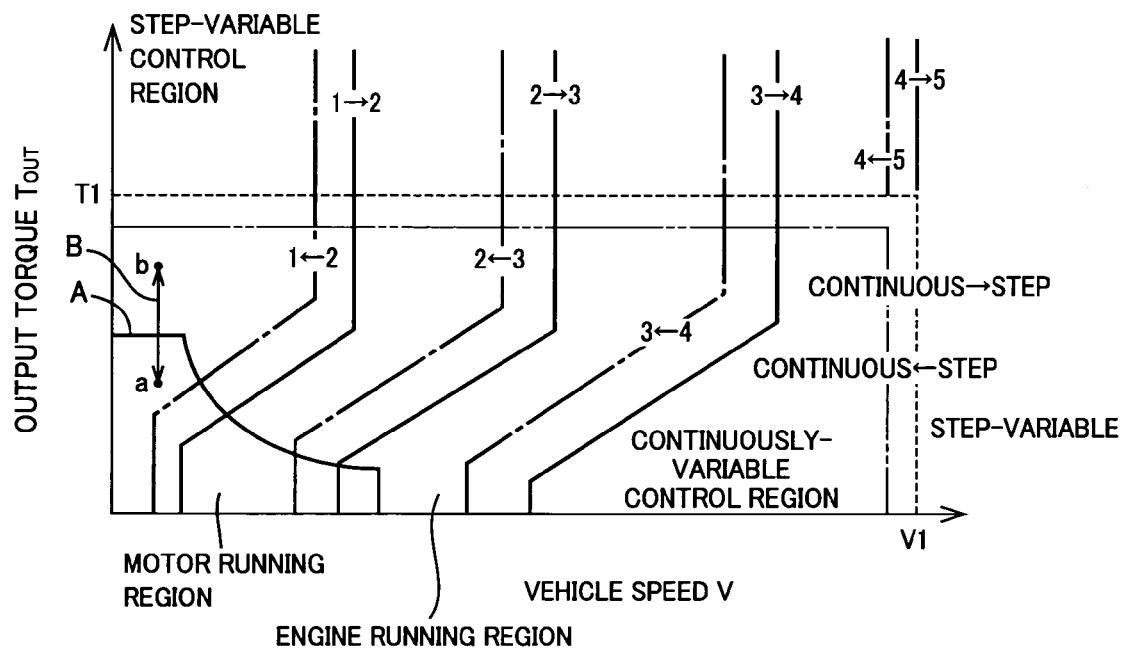
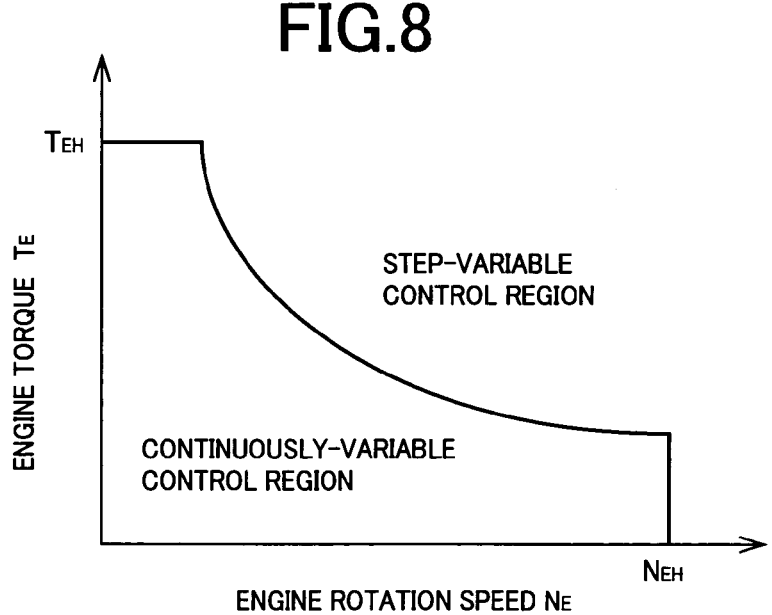

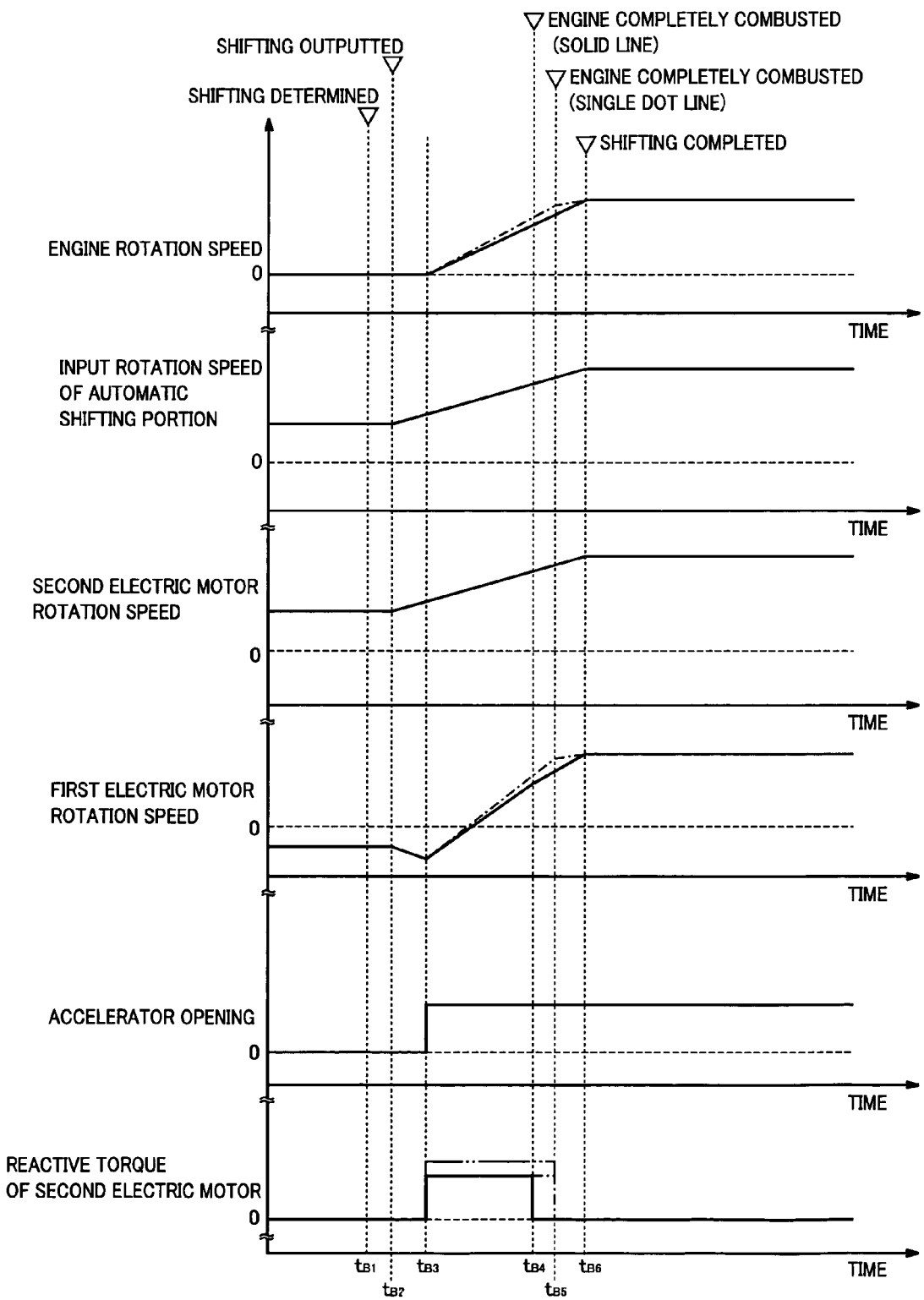

CONTROL DEVICE FOR HYBRID VEHICLE POWER TRANSMITTING APPARATUS

TECHNICAL FIELD

The present invention relates to control devices for hybrid vehicle power transmitting apparatus. More particularly, it relates to a technology for suppressing the occurrence of degradation in startability of an engine caused by altering a fuel type supplied to the engine.

BACKGROUND ART

In the related art, there has heretofore been known a hybrid drive apparatus in which a distributing mechanism allows an output of an engine to be distributed to a first electric motor and an output member connected to drive wheels, whereby the first electric motor is caused to charge a battery during a running of a vehicle, propelled by the engine, which is also propelled to run with a second electric motor acting as a drive-force source. For instance, Patent Publication 1 (Japanese Patent Application Publication No. 9-170533) discloses such a hybrid drive apparatus. With a control device for such a hybrid drive apparatus, the first electric motor operates to rotatably drive the engine via the distributing mechanism such that the engine is started up.

Besides, other technologies have heretofore been known as disclosed in Patent Publication 2 (Japanese Patent Application Publication No. 2005-264762) and Patent Publication 3 (Japanese Patent Application Publication No. 2000-238555).

At present, even for the engine driven with, for instance, gasoline, bio fuel or the like may be used as other fuel than gasoline. Therefore, a research and development work has been required to provide a vehicle addressing various issues arising from a plurality of types of fuels. Further, the types of fuel supplied to the engine are different from each other, and fuels have different properties in volatile or the like, causing fluctuation to take place in startability of the engine. For instance, ethanol has a lower volatile than that of gasoline with a resultant difficulty of achieving an explosion. Thus, it has been known that using an ethanol blend fuel with ethanol being mixed to gasoline at a certain mixing ratio may degrade startability of the engine.

Such degradation in startability of the engine is remarkably present especially whether the engine operates in a cold area. If degradation occurs in startability of the engine arising from the fuel type in use, a need arises to address the various issues. To this end, a time period for rotatably driving the engine is extended, or a rotation speed of the engine is promptly caused to increase for startup of the engine. This immediately increases temperature of fuel compressed and expanded in the engine, to a level available to initiate an ignition, thereby suppressing occurrence of degradation in startability of the engine.

However, no control device for the hybrid drive apparatus, disclosed in Patent Publication 1 mentioned above, has been developed in consideration of the fuel type being altered. Thus, no alteration has been made on a control to start up the engine depending on the fuel type in use when starting up the engine. Accordingly, when starting up the engine with such a control device, degradation may conceivably occur in startability of the engine when the fuel type supplied to the engine is altered.

DISCLOSURE OF THE INVENTION

The present invention has been completed with such a view in mind, and has an object to provide a control device for a hybrid vehicle power transmitting apparatus which can suppress the occurrence of startability degradation of an engine arising from an alteration on a fuel type when the fuel type supplied to the engine.

For achieving the above object, the invention in a first aspect is relates to a control device for a hybrid vehicle power transmitting apparatus. The hybrid vehicle power transmitting apparatus comprises (i) an electrically controlled differential portion including a differential mechanism connected between an engine and drive wheels, and a first electric motor connected to the differential mechanism in a power transmissive state, a differential state of the differential mechanism being controlled upon controlling an operating state of the first electric motor, and (ii) a second electric motor connected to a power transmitting path.

The invention is characterized by that the control device performs an alteration on a reactive control, representing an operation to control reactive torque of the second electric motor in opposition to rotational resistance of the engine during startup of the engine, based on a fuel type used in operating the engine.

A second aspect of the invention is featured by that the alteration on the reactive control is to increase the reactive torque of the second electric motor when degradation occurs in startability of the engine.

A third aspect of the invention is featured by that the alteration on the reactive control is to extend a time for the reactive torque of the second electric motor to be generated when degradation occurs in startability of the engine.

For achieving the above object, the invention in a fourth aspect is relates to a control device for a hybrid vehicle power transmitting apparatus. The hybrid vehicle power transmitting apparatus comprises (i) an electrically controlled differential portion including a differential mechanism connected between an engine and drive wheels, and a first electric motor connected to the differential mechanism in a power transmissive state, a differential state of the differential mechanism being controlled upon controlling an operating state of the first electric motor, and (ii) a second electric motor connected to a power transmitting path;

The invention is characterized by that the control device is operative to alter an engine rotation speed control representing an operation of the first electric motor to control an engine rotation speed during startup of the engine, based on a fuel type used in operating the engine.

A fifth aspect of the invention is featured by that the alteration on the engine rotation speed control is to increase a variation rate of a rotation speed of the first electric motor per unit time upon degradation occurrence in startability of the engine.

A sixth aspect of the invention is featured by that the alteration on the engine rotation speed control is to increase a target rotation speed of the first electric motor for increasing the rotation speed of the first electric motor for startup of the engine upon degradation occurrence in startability of the engine.

A seventh aspect of the invention is featured by that the alteration on the engine rotation speed control is executed when a temperature of the engine is lower than a given value.

An eighth aspect of the invention is featured by that the alteration on the engine rotation speed control is executed when the temperature of the engine is lower than the given value.

A ninth aspect of the invention is featured by that the hybrid vehicle power transmitting apparatus includes a shifting portion forming part of the power transmitting path, the alteration on the reactive control being executed during a shifting operation of the shifting portion.

A tenth aspect of the invention is featured by that the hybrid vehicle power transmitting apparatus includes a shifting portion forming part of the power transmitting path, the alteration on the engine rotation speed control being executed during a shifting operation of the shifting portion.

An eleventh aspect of the invention is featured by that output torque of the engine is detected based on reactive torque of the first electric motor counteracting an output torque of the engine, based on which the fuel type is discriminated.

A twelfth aspect of the invention is featured by that the fuel type is discriminated when fuel in a fuel tank mounted on a vehicle increases.

A thirteenth aspect is featured by that the fuel type is discriminated when detecting an opening of a lid for fueling port of a fuel tank mounted on a vehicle.

A fourteenth aspect of the invention is featured by that the hybrid vehicle power transmitting apparatus includes a shifting portion forming part of the power transmitting path.

A fifteenth aspect is featured by that the shifting portion is rendered operative to function as an automatic transmission with a speed ratio being automatically varied.

A sixteenth aspect of the invention is featured by that the shifting portion includes a step-variable transmission.

A seventeenth aspect of the invention is featured by that the electrically controlled differential portion includes more than two electric motors, composed of the first electric motor and second electric motor, and a planetary gear set.

According to the first aspect of the invention, the control device alters the reactive control representing the control of reactive torque of the second electric motor counteracting rotational resistance of the engine during startup of the engine based on the fuel type used in operating the engine. Thus, reactive torque of the second electric motor can be regulated depending on the fuel type for increasing the rotation speed of the engine for startup of the engine. This allows fuel compressed and expanded in the engine to increase in temperature to a level available to initiate an ignition, thereby suppressing the occurrence of degradation in startability of the engine.

According to the second aspect of the invention, the alteration on the reactive control is to increase the reactive torque of the second electric motor upon degradation occurrence in startability of the engine. Thus, when degradation occurs in startability of the engine, the rotation speed of the engine is caused to rapidly increase. This allows fuel compressed and expanded in the engine to increase in temperature to the level available to initiate the ignition, thereby suppressing occurrence of startability degradation of the engine.

Preferably, the alteration on the reactive control is performed such that the lower the startability of the engine, the greater will be the reactive torque of the second electric motor. With such an operation, the engine rotation speed is caused to increase such that the lower the startability of the engine, the higher will be the rotation speed of the engine. This allows fuel compressed and expanded in the engine to increase in temperature to the level available to initiate the ignition, thereby suppressing the occurrence of startability degradation of the engine.

According to the third aspect of the invention, the alteration on the reactive control is to extend a time for the reactive torque of the second electric motor to be generated when degradation occurs in startability of the engine. Thus, when degradation occurs in startability of the engine, the control devices extends the time required for rotatably driving the engine for startup of the engine. This allows fuel compressed and expanded in the engine to increase in temperature to the level available to initiate the ignition, thereby suppressing the occurrence of startability degradation of the engine.

Preferably, the alteration on the reactive control is executed such that the lower the startability of the engine resulting from the alteration of the fuel type, the longer will be the time required for the second electric motor to generate reactive torque. Such an alteration is executed such that the lower the startability of the engine, the longer will be the time for rotatably driving the engine for startup thereof. This allows fuel, compressed and expanded in the engine, to increase in temperature to the level available to initiate the ignition, thereby suppressing the occurrence of startability degradation of the engine.

According to the fourth aspect of the invention, the control device performs the alteration on the engine rotation speed control, representing the operation of the first electric motor to control the engine rotation speed during startup of the engine, based on the fuel type used in operating the engine. Thus, the rotation speed of the engine, caused to increase with the first electric motor during startup of the engine, is adjusted based on the fuel type in use. This allows fuel compressed and expanded in the engine to increase in temperature to the level available to initiate the ignition, thereby suppressing the occurrence of startability degradation of the engine.

According to the fifth aspect of the invention, the alteration on the engine rotation speed control is to increase the variation rate of the rotation speed of the first electric motor per unit time upon degradation occurrence in startability of the engine. Thus, when degradation occurs in startability of the engine, the first electric motor rotatably drives the engine to rapidly increase the rotation speed thereof. This allows fuel compressed and expanded in the engine to increase in temperature to the level available to initiate the ignition, thereby suppressing the occurrence of startability degradation of the engine.

Preferably, the alteration on the engine rotation speed control is performed such that the lower the startability of the engine resulting from the alteration of the fuel type, the greater will be the variation rate of the rotation speed of the first electric motor per unit time. This alteration is executed such that the lower the startability of the engine, the higher will be the rotation speed of the engine rotatably driven with the first electric motor. This allows fuel compressed and expanded in the engine to increase in temperature to the level available to initiate the ignition, thereby suppressing the occurrence of startability degradation of the engine.

According to the six aspect of the invention, the alteration on the engine rotation speed control is to increase the target rotation speed of the first electric motor when increasing the rotation speed of the first electric motor for startup of the engine when degradation occurs in startability of the engine. Thus, when degradation occurs in startability of the engine, the first electric motor rotatably drives the engine to rapidly increase the rotation speed thereof. This allows fuel compressed and expanded in the engine to increase in temperature to the level available to initiate the ignition, thereby suppressing the occurrence of startability degradation of the engine.

Preferably, the alteration on the engine rotation speed control is performed such that the lower the startability of the engine resulting from the alteration of the fuel type, the higher will be the target rotation speed of the first electric motor when increasing the rotation speed of the first electric motor for startup of the engine. With such an alteration, with a decrease in startability of the engine, the rotation speed of the engine, rotatably driven with the first electric motor, is caused to increase up to a high rotation speed in line with the target rotation speed of the first electric motor. This allows fuel compressed and expanded in the engine to increase in temperature to the level available to initiate the ignition, thereby suppressing the occurrence of startability degradation of the engine.

According to the seventh aspect of the invention, the alteration on the engine rotation speed control is executed when the temperature of the engine is lower than the given value.

This enables the suppression of startability degradation of the engine during a cold state with likelihood of the engine suffering from degraded startability.

According to the eighth aspect of the invention, the alteration on the engine rotation speed control is executed when the temperature of the engine is lower than the given value. This enables the suppression of startability degradation of the engine during the cold state with likelihood of the engine suffering from degraded startability. Preferably, as used herein, the term "given value" on the temperature of the engine refers to a preset engine temperature determining value enabling a determination to be made that if the temperature of the engine decreases to be lower than such a given value, then degradation occurs in startability of the engine to a level less than a lower limit.

According to the ninth aspect of the invention, the hybrid vehicle power transmitting apparatus comprises the shifting portion forming part of the power transmitting path. Thus, the hybrid vehicle power transmitting apparatus can provide a speed ratio with a further increased varying ratio than that of a speed ratio achieved with a power transmitting apparatus structured in the absence of the shifting portion, obtaining favorable fuel economy performance. In addition, when an attempt is made to start up the engine during the shifting of the automatic shifting portion, a rapid startup of the engine is often required to promptly raise output torque. In this respect, the alteration on the engine rotation speed control is executed during the shifting of the automatic shifting portion, with an accompanying capability of suppressing startability degradation of the engine when a need arises to rapidly achieve startup of the engine.

According to the tenth aspect of the invention, the hybrid vehicle power transmitting apparatus comprises the shifting portion forming part of the power transmitting path. Thus, the hybrid vehicle power transmitting apparatus can provide the speed ratio with the further increased varying ratio than that of the speed ratio achieved with the power transmitting apparatus structured in the absence of the shifting portion, obtaining favorable fuel economy performance. In addition, when the attempt is made to start up the engine during the shifting of the automatic shifting portion, the rapid startup of the engine is often required to promptly raise output torque. In this respect, the alteration on the engine rotation speed control is executed during the shifting of the automatic shifting portion, with the accompanying capability of suppressing startability degradation of the engine when the need arises to rapidly achieve startup of the engine.

Further, the engine has an output characteristic that varies depending on the fuel type supplied to the engine. According to the eleventh aspect of the invention, the output torque of the engine is detected based on reactive torque of the first electric motor counteracting the output torque of the engine and the fuel type is discriminated based on the output torque of the engine. Thus, detecting reactive torque of the first electric motor enables the fuel type to be easily discriminated.

According to the twelfth aspect of the invention, the fuel type is discriminated when fuel in the fuel tank mounted on the vehicle increases. Thus, such discrimination is not continuously executed but executed only when needed, achieving a reduction in load of the control device.

According to the thirteenth aspect of the invention, the fuel type is discriminated when detecting the opening of the lid for fueling port of the fuel tank mounted on the vehicle. Thus, such discrimination is not continuously executed but executed only when needed, achieving a reduction in load of the control device.

According to the fourteenth aspect of the invention, the hybrid vehicle power transmitting apparatus includes the shifting portion forming part of the power transmitting path. Thus, the hybrid vehicle power transmitting apparatus can provide a speed ratio with a further increased varying ratio than that of a speed ratio achieved with a power transmitting apparatus structured in the absence of the shifting portion, obtaining favorable fuel economy performance.

According to the fifteenth aspect of the invention, the shifting portion is rendered operative to function as the automatic transmission with the speed ratio being automatically varied. Thus, the hybrid vehicle power transmitting apparatus provides a speed ratio that can be automatically varied, enabling a reduction in load of a driver.

According to the sixteenth aspect of the, the shifting portion includes the step-variable transmission. Thus, the shifting portion can provide a speed ratio with varying in a wide range, making it possible to obtain favorable fuel economy performance.

According to the seventeenth aspect of the invention, the electrically controlled differential portion includes more than two electric motors, composed of the first and second electric motors, and the planetary gear set. This enables the electrically controlled differential portion to take the form of a structure that can continuously varies torque output from the electrically controlled differential portion upon utilizing a differential action of the planetary gear set.

BRIEF DESCRIPTION OF THE DRAWINGS

FIG. 7 is a view representing one example of a preliminarily stored shifting diagram, plotted on a two-dimensional coordinate in terms of parameters including a vehicle speed and output torque, based on which the operation is executed whether to a shifting is executed in an automatic shifting portion; an example of the preliminarily stored shifting diagram based on which the switching determination of the shifting state of the shifting mechanism is made; and one example of a preliminarily stored drive-force source switching diagram having a boundary line between an engine drive region and a motor drive region based on which an engine drive mode and a motor drive mode is switched.

FIG. 8 is a conceptual view, showing the preliminarily stored relationship, involving a boundary line, between a continuously variable control region and a step-variable control region, which is suitable for mapping a boundary between the continuously variable control region and the step-variable control region shown in broken lines in FIG. 7.

FIG. 14 is a timing chart, illustrating the control operations shown in the flow chart of FIG. 13, which represents the second embodiment representing an embodiment different from that of FIG. 11, which represents an exemplary case wherein upon depression of an accelerator pedal during a motor drive mode, an engine startup determination is made under a downshift mode of the automatic shifting portion.

BEST MODE FOR CARRYING OUT THE INVENTION

Now, various embodiments of the present invention will be described below in detail with reference to accompanying drawings.

<First Embodiment>

Figures 1, 2:
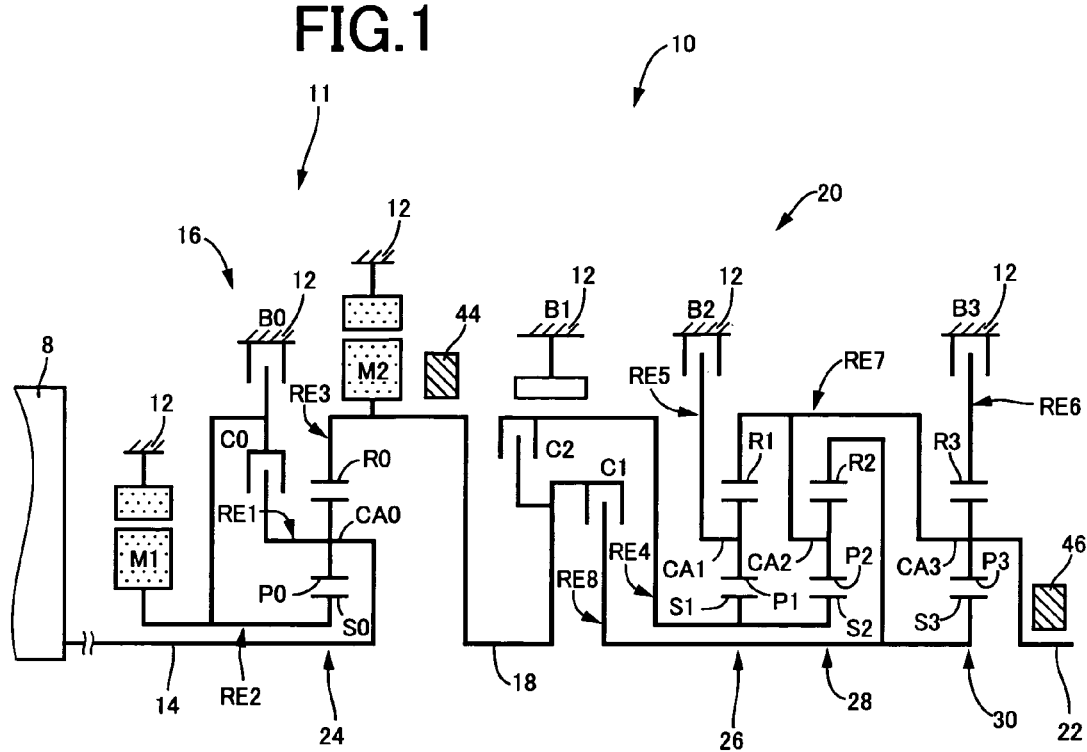
FIG. 1 is a skeleton view explaining a structure of a hybrid vehicle drive apparatus to which a control device of the present invention is applied.
FIG. 2 is an engagement operation table illustrating the relationship between a shifting operation, in which the hybrid vehicle drive apparatus, shown in FIG. 1, is placed in a continuously variable or step-variable shifting state, and the operation of a hydraulic-type frictional engaging device in combination.

FIG. 1 is a skeleton view illustrating a shifting mechanism 10, forming part of a drive apparatus for a hybrid vehicle, to which a control device of one embodiment according to the present invention is applied. As shown in FIG. 1, the shifting mechanism 10 corresponding to a claimed power transmitting apparatus for a hybrid vehicle includes an input shaft 14 serving as an input rotary member, a differential portion 11 directly connected to the input shaft 14 or indirectly connected thereto through a pulsation absorbing damper (vibration damping device) not shown, an automatic shifting portion 20 connected via a power transmitting member (transmission shaft) 18 in series through a power transmitting path between the differential mechanism 11 and drive wheels 38 (see FIG. 6) to serve as a step-variable type transmission, and an output shaft 22 connected to the automatic shifting portion 20 as an output rotary member, all of which are disposed in a transmission casing 12 (hereinafter briefly referred to as a "casing 12") serving as a non-rotary member connectedly mounted on a vehicle body.

Figure 6:
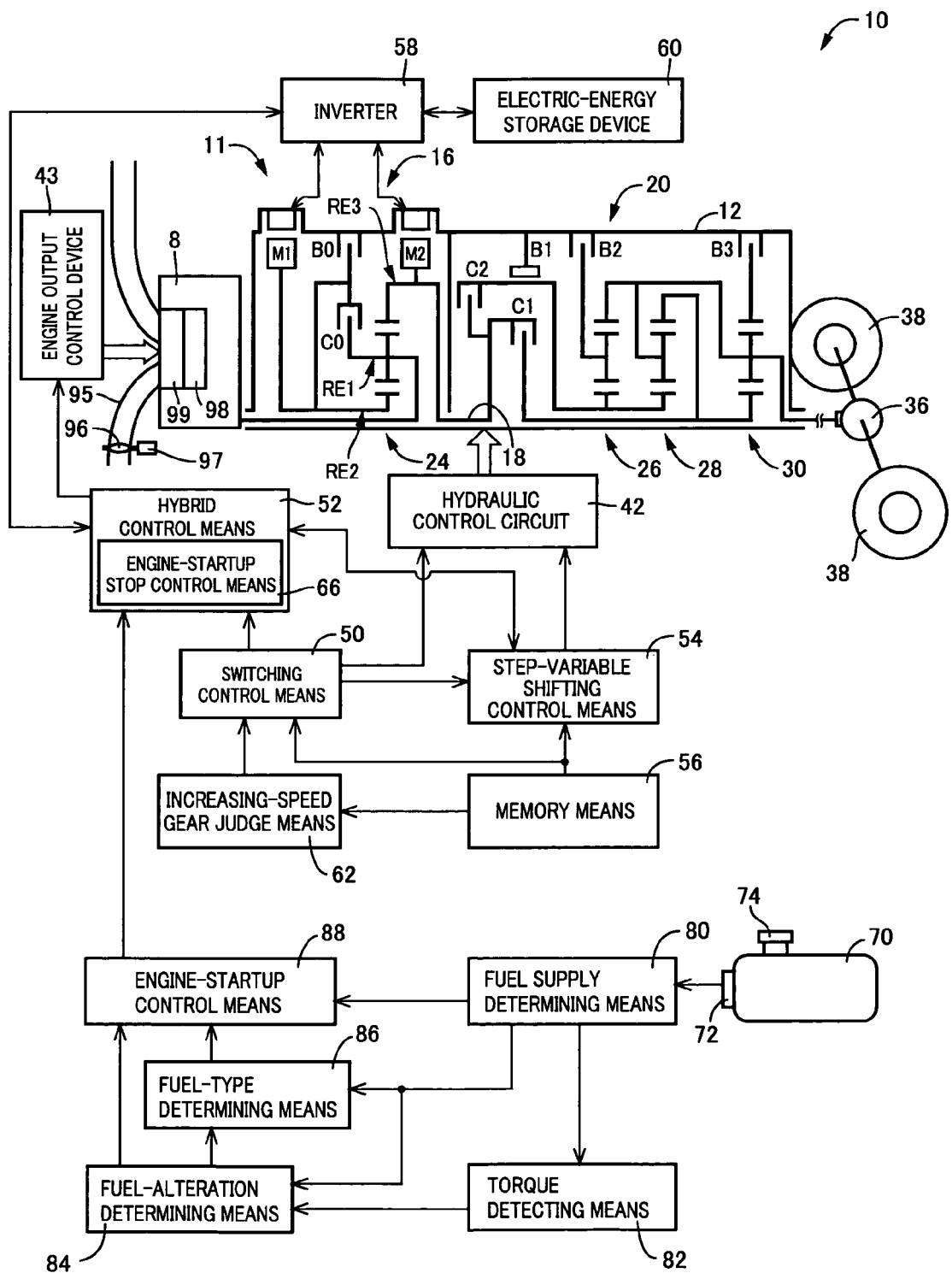
FIG. 6 is a functional block diagram illustrating a major control function to be executed by the electronic control device related to a first embodiment shown in FIG. 4.

The shifting mechanism 10, preferably applicable to a vehicle of FR type (front-engine rear-drive type), is disposed between a longitudinally mounted engine 8, i.e., an internal combustion engine such as a gasoline engine or a diesel engine serving as a drive force directly connected to the input shaft 14 or indirectly connected thereto via the pulsation absorbing damper, and a pair of drive wheels 38 (FIG. 6). This allows a vehicle drive force to be transmitted to the pair of drive wheels 38 on left and right in sequence through a differential gear device 36 (final speed reduction gear) and a pair of drive axles.

With the shifting mechanism 10 of the present embodiment, the engine 8 and the differential portion 11 are connected to each other in a direct connection. As used herein, the term "direct connection" may refer to a connection, established without intervening any fluid-type transmitting device such as a torque converter or a fluid coupling, which involves a connection established with the use of the vibration damping device. Upper and lower halves of the shifting mechanism 10 are structured in symmetric relation with respect to an axis of the shifting mechanism 10 and, hence, the lower half is omitted in the skeleton view of FIG. 1.

The differential portion 11 corresponding to a claimed electrically controlled differential portion can be said to be an electrically controlled differential portion in respect of an operation in which a differential state is altered using a first electric motor. The differential portion 11 includes a first electric motor M1, a power distributing mechanism 16 serving as a mechanical mechanism like a differential mechanism through which an output of the engine 8, inputted to the input shaft 14, is transferred to the first electric motor M1 and the power transmitting member 18, and a second electric motor M2 unitarily rotatable with the power transmitting member 18.

Further, the first and second electric motors M1 and M2 are so-called motor/generators each having a function even as an electric power generator. The first electric motor M1 has at least one function as an electric power generator that generates a reactive force, and the second electric motor M2 has at least a function as an electric motor serving as a drive force source to generate a drive force to run the vehicle.

The power distributing mechanism 16, corresponding to the differential mechanism of the present invention, mainly includes a differential-portion planetary gear unit 24 of a single pinion type having a given gear ratio $\rho 0$ of, for instance, about "0.418", a switching clutch C0 and a switching brake B0. The differential-portion planetary gear unit 24 includes rotary elements, such as a differential-portion sun gear S0, a differential-portion planetary gears P0, a differential-portion carrier CA0 supporting the differential-portion planetary gears P0 to be rotatable about its axis and about the axis of the differential-portion sun gear S0, and a differential-portion ring gear R0 meshing with the differential-portion sun gear S0 through the differential-portion planetary gears P0. With the differential-portion sun gear S0 and the differential-portion ring gear R0 assigned to have the numbers of teeth represented by ZS0 and ZR0, respectively, the gear ratio $\rho 0$ is expressed as ZS0/ZR0.

With the power distributing mechanism 16 of such a structure, the differential-portion carrier CA0 is connected to the input shaft 14, i.e., to the engine 8; the differential-portion sun gear S0 is connected to the first electric motor M1; and the differential-portion ring gear R0 is connected to the power transmitting member 18. The switching brake B0 is disposed between the differential-portion sun gear S0 and the casing 12, and the switching clutch C0 is disposed between the differential-portion sun gear S0 and the differential-portion carrier CA0. With both the switching clutch C0 and the switching brake B0 being disengaged, the power distributing mechanism 16 is rendered operative such that the differential-portion sun gear S0, the differential-portion carrier CA0 and the differential-portion ring gear R0, forming the three elements of the differential-portion planetary gear unit 24, are caused to rotate relative to each other to enable the operation in a differential action, i.e., in a differential state under which the differential action is effectuated.

Thus, the output of the engine 8 is distributed to the first electric motor M1 and the power transmitting member 18 with a part of the engine output distributed to the first electric motor M1 being used to generate electric energy to be stored in a battery or to drivably rotate the second electric motor M2. This renders the differential portion 11 (power distributing mechanism 16) operative as an electrically controlled differential device. Thus, the differential portion 11 is placed in a so-called continuously variable shifting state (electrically controlled CVT state), in which a rotation speed of the power transmitting member 18 varies in a continuous fashion regardless of the engine 8 operating at a given rotation speed. That is, as the power distributing mechanism 16 is placed in the differential state, the differential portion 11 is also placed in differential state. In this casing, the differential portion 11 is placed in the continuously variable shifting state to operate as the electrically controlled continuously variable transmission with a speed ratio $\gamma 0$ (a ratio of rotation speed of the driving device input shaft 14 to the rotation speed of the power transmitting member 18) continuously varying in a value ranging from a minimum value $\gamma 0min$ to a maximum value $\gamma 0max$. In the differential state of the power distributing mechanism 16, the first electric motor M1, the second electric motor M2 and engine 8 all connected to the power transmitting path in the power transmissive state are controlled in their operating state. Thus, the differential state of the power distributing mechanism 16, that is, the differential state between the rotation speed of the input shaft 14 and that of the power transmitting member 18 is controlled.

Under such a state, as the switching clutch C0 or the switching brake B0 is engaged, the power distributing mechanism 16 is disenabled to perform the differential action, i.e., placed in a non-differential state in which no differential action is effectuated. In particular, as the switching clutch C0 is engaged to cause the differential-portion sun gear S0 and the differential-portion carrier CA0 to be unitarily coupled to each other, the power distributing mechanism 16 is placed in a locked state under which the differential-portion sun gear S0, the differential-portion carrier CA0 and the differential-portion ring gear R0, serving as the three elements of the differential-portion planetary gear unit 24, are caused to rotate together, i.e., in a unitarily rotating state under the non-differential state in which no differential action is effectuated. Thus, the differential portion 11 is placed in the non-differential state. Therefore, the rotation speeds of the engine 8 and the power transmitting member 18 coincide with each other, so that the differential portion 11 (power distributing mechanism 16) is placed in a fixed shifting state, i.e., a step-variable shifting state to function as a transmission with the speed ratio $\gamma 0$ connected to a value of "1".

Instead of the switching clutch C0, next, if the switching brake B0 is engaged to connect the differential-portion sun gear S0 to the casing 12, then, the power distributing mechanism 16 is placed in the locked state. Thus, the differential-portion sun gear S0 is placed in the non-rotating state under the non-differential state in which no differential action is initiated, causing the differential portion 11 to be placed in the non-differential state.

Since the differential-portion ring gear R0 rotates at a speed higher than that of the differential-portion carrier CA0, the power distributing mechanism 16 functions as a speed-increasing mechanism. Thus, the differential portion 11 (power distributing mechanism 16) is placed in the fixed shifting state, i.e., the step-variable shifting state to perform a function as a speed-increasing transmission with the speed ratio $\gamma 0$ connected to a value smaller than "1", i.e., for example, about 0.7.

With the present embodiment, the switching clutch C0 and the switching brake B0 selectively place the shifting state of differential portion 11 (power distributing mechanism 16) in the differential state, i.e., the unlocked state and the non-differential state, i.e., the locked state. That is, the switching clutch C0 and the switching brake B0 serves as a differential state switching device that selectively switches the differential portion 11 (power distributing mechanism 16) in one of the continuously variable shifting state and the fixed shifting state.

The continuously variable shifting state is operative to perform the electrically and continuously controlled variable shifting operation, under which the differential portion 11 (power distributing mechanism 16) is placed in the differential state (coupled state) to perform the function as the electrically controlled differential device operative to function as the continuously variable transmission with, for instance, the shifting ratio is continuously variable. In the fixed shifting state, the differential portion 11 (power distributing mechanism 16) is placed in the shifting state, disenabling the function of the electrically controlled continuously variable shifting operation, such as the locked state disenabling the function of the continuously variable transmission in which no continuously variable shifting operation is effectuated with a speed ratio being locked at a connected level.

In the locked state, the differential portion 11 (power distributing mechanism 16) is rendered operative as a transmission of a single-stage or a multi-stage with a speed ratio of one kind or speed ratios of more than two kinds to function in the fixed shifting state (non-differential state), disenabling the electrically controlled continuously variable shifting operation, under which the differential portion 11 (power distributing mechanism 16) operates as the transmission of the single-stage or the multi-stage with the speed ratio kept at a connected level.

The automatic shifting portion 20 corresponding to a claimed shifting portion functions as the step-variable shifting automatic transmission 20 which can change i.e. change the shifting ratio (rotation speed $N_{18}$ of the power transmitting/rotation speed $N_{OUT}$ of the output shaft) stepwise. includes a first planetary gear unit 26 of a single-pinion type, a second planetary gear unit 28 of a single-pinion type and a third planetary gear unit 30 of a single-pinion type. The first planetary gear unit 26 includes a first sun gear S1, first planetary gears P1, a first carrier CA1 supporting the first planetary gears P1 to be rotatable about its axis and about the axis of the first sun gear S1, and a first differential-portion ring gear R0 meshing with the first sun gear S1 via the first planetary gears P1, having a gear ratio $\rho 1$ of, for instance, about "0.562". The second planetary gear unit 28 includes a second sun gear S2, second planetary gears P2, a second carrier CA2 supporting the second planetary gears P2 to be rotatable about its axis and about the axis of the second sun gear S2, and a second ring gear R2 meshing with the second sun gear S2 via the second planetary gears P2, having for example a gear ratio ρ2 of about "0.425".

The third planetary gear unit 30 includes a third sun gear S3, third planetary gears P3, a third carrier CA4 supporting the third planetary gears P3 to be rotatable about its axis and about the axis of the third sun gear S3, and the third ring gear R3 meshing with the third sun gear S3 through the third planetary gears P3, having a gear ratio ρ3 of about "0.421". With the first sun gear S, the first differential-portion ring gear R0, the second sun gear S2, the second ring gear R2, the third sun gear S3 and the third ring gear R3 assigned to have the numbers of teeth represented by ZS1, ZR1, ZS2, ZR2, ZS3 and ZR3, respectively, the gear ratios ρ1, ρ2 and ρ3 are represented by ZS1/ZR1, ZS2/ZR2, and ZS3/ZR3, respectively.

With the automatic shifting portion 20, the first sun gear S and the second sun gear S2 are integrally connected to each other and selectively connected to the power transmitting member 18 through a second clutch C2 while selectively connected to the casing 12 through a first brake B1. The first carrier CA1 is selectively connected to the casing 12 through a second brake B2 and the third ring gear R3 is selectively connected to the casing 12 through a third brake B3. The first differential-portion ring gear R0, the second carrier CA2 and the third carrier CA3 are integrally connected to each other and also connected to the output shaft 22. The second ring gear R2 and the third sun gear S3 are integrally connected to each other and selectively connected to the power transmitting member 18 through the first clutch C1.

Thus, the automatic shifting portion 20 and the power transmitting member 18 are selectively connected to each other through the first clutch C1 or the second clutch C2 used for establishing a gear shift position in the automatic shifting portion 20. In other words, the first clutch C1 and the second clutch C2 collectively function as an engaging device for switching the operations of the power transmitting member 18 and the automatic shifting portion 20. That is, such an engaging device selectively switches a power transmitting path between the differential portion 11 (transmitting member 18) and the drive wheels 38 in a power transmitting state, enabling a power transfer through the power transmission path, and a power interrupting state interrupting the power transfer through the power transmission path. That is, with at least one of the first clutch C1 and the second clutch C2 being engaged, the power transmitting path is placed in the power transmitting state. In contrast, with both the first clutch C1 and the second clutch C2 being disengaged, the power transmitting path is placed in the power interrupting state.

The switching clutch C0, the first clutch C1, the second clutch C2, the switching brake B0, the first brake B1, the second brake B2 and the third brake B3 are hydraulic-type frictionally coupling devices used in a vehicular step-variable type automatic transmission of the related art. An example of the frictionally coupling device includes a wet-type multiple-disc type that includes a plurality of superposed friction plates pressed against each other with a hydraulic actuator or a band brake comprised of a rotary drum having an outer circumferential surface on which one band or two bands are wound to be tightened at one ends with a hydraulic actuator to allow associated component parts, between which the rotary drum intervenes, to be selectively connected to each other.

With the shifting mechanism 10 of such a structure, as indicated in an engagement operation Table shown FIG. 2, the switching clutch C0, the first clutch C1, the second clutch C2, the switching brake B0, the first brake B1, the second brake B2 and the third brake B3 are selectively engaged in operation. This selectively establishes either one of a 1st-speed gear position (1st-speed gear shift position) to a 5th-speed gear position (5th-speed gear shift position) or one of a reverse-drive gear position (reverse-drive gear shift position) and a neural position with a speed ratios γ (input-shaft rotation speed $N_{IN}$/output-shaft rotation speed $N_{OUT}$) varying in nearly equal ratio for each gear position.

In particular, with the present embodiment, the power distributing mechanism 16 is comprised of the switching clutch C0 and the switching brake B0, either one of which is engaged in operation. This makes it possible to cause the differential portion 11 to be placed in the continuously variable shifting state enabling the operation as the continuously variable transmission while establishing the fixed shifting state enabling the transmission to operate with the speed ratio maintained at a fixed level. With either one of the switching clutch C0 and the switching brake B0 being engaged in operation, accordingly, the differential portion 11 is placed in the fixed shifting state to cooperate with the automatic shifting portion 20 to allow the shifting mechanism 10 to operate as the step-variable transmission placed in the step-variable shifting state. With both of the switching clutch C0 and the switching brake B0 being disengaged in operation, the differential portion 11 is placed in the continuously variable shifting state to cooperate with the automatic shifting portion 20 to allow the shifting mechanism 10 to operate as the electrically controlled continuously variable transmission placed in the continuously variable shifting state.

In other words, the shifting mechanism 10 is switched to the step-variable shifting state, upon engagement of either one of the switching clutch C0 and the switching brake B0, and the continuously variable shifting state with both of the switching clutch C0 and the switching brake B0 being brought into disengagement. In addition, it can be said that the differential portion 11 is the transmission that can also be switched to the step-variable shifting state and the continuously variable shifting state.

For example, as shown in FIG. 2, under a circumstance where the shifting mechanism 10 is caused to function as the step-variable transmission, engaging the switching clutch C0, the first clutch C1 and the third brake B3 results in the 1st-speed gear position with the speed ratio γ1 having a maximum value of, for instance, about "3.357". Engaging the switching clutch C0, the first clutch C1 and the second brake B2 results in the 2nd-speed gear position with the speed ratio γ2 of, for instance, about "2.180", which is lower than that of the 1st-speed gear position.

Engaging the switching clutch C0, the first clutch C1 and the first brake B1 results in the 3rd-speed gear position with the speed ratio γ3 of, for instance, about "1.424", which is lower than that of the 2nd-speed gear position. Engaging the switching clutch C0, the first clutch C1 and the second clutch C2 results in the 4th-speed gear position with the speed ratio γ4 of, for instance, about "1.000", which is lower than that of the 3rd-speed gear position.

With the first clutch C1, the second clutch C2 and the switching brake B0 being engaged, the 5th-speed gear position is established with the speed ratio γ5 of, for example, about "0.705", which is smaller than that of the 4th-speed gear position. With the second clutch C2 and the third brake B3 being engaged, further, the reverse-drive gear position is established with the speed ratio γR of, for example, about "3.209", which lies at a value between those of the 1st- and 2nd-speed gear positions. For the neutral "N" state to be established, for instance, all the clutches and the brakes C0, C1, C2, B0, B1, B2 and B3 are disengaged However, for the shifting mechanism 10 to function as the continuously variable transmission, both the switching clutch C0 and the switching brake B0 are disengaged as indicated in the engagement operation table shown in FIG. 2. With such operation, the differential portion 11 is rendered operative to function as the continuously variable transmission and the automatic shifting portion 20, connected thereto in series, is rendered operative to function as the step-variable transmission. This causes the rotation speed input to the automatic shifting portion 20, i.e., the rotation speed of the power transmitting member 18 to be continuously varied for each of the 1st-speed gear position, the 2nd-speed gear position, the 3rd-speed gear position and the 4th-speed gear position. This allows each of the various gear positions to be established in an infinitely variable shifting ratio. Accordingly, a speed ratio can be continuously variable across the adjacent gear positions, making it possible for the shifting mechanism 10 as a whole to obtain an infinitely variable total speed ratio (overall speed ratio) γT.

Figure 3:
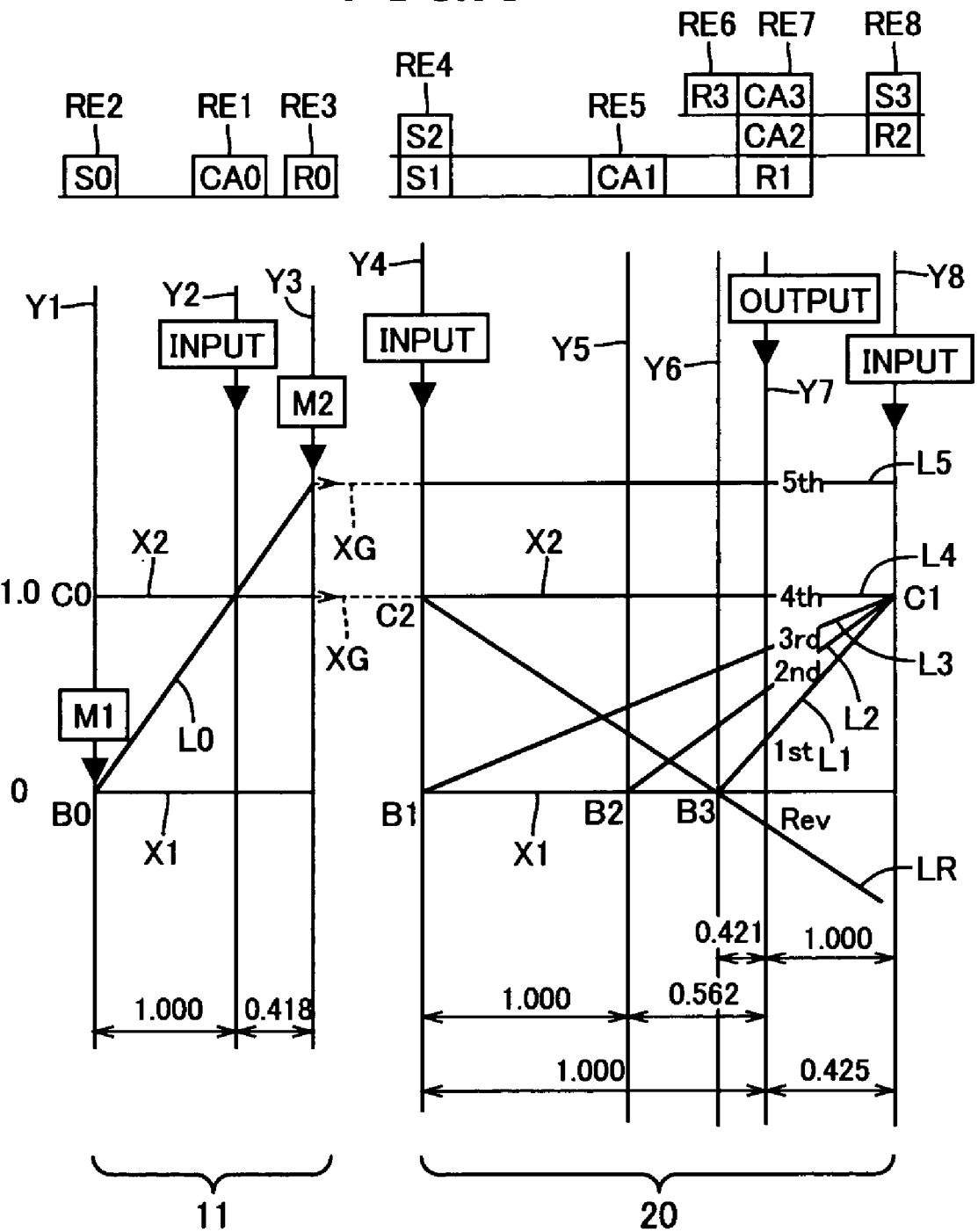
FIG. 3 is a collinear chart illustrating the relative rotation speed of rotary elements in each of different gear positions when the hybrid vehicle drive apparatus, shown in FIG. 1, is caused to operate in the step-variable shifting state.

FIG. 3 shows a collinear chart plotted in straight lines that can represent a correlation among the rotation speeds of the various rotary elements available to accomplish clutch engagement states in different modes depending on the gear positions of the shifting mechanism 10 comprised of the differential portion 11, functioning as the continuously variable shifting portion or the first shifting portion, and the automatic shifting portion 20 functioning as the step-variable shifting portion or the second shifting portion. The collinear chart of FIG. 3 is a two-dimensional coordinate system having the horizontal axis, representing the correlation among the gear ratios ρ established with the planetary gear units 24, 26, 28 and 30, and the vertical axis representing relative rotation speeds of the rotary elements. The lowermost line X1 of three horizontal lines indicates the rotation speed laying at a value of "0". An upper horizontal line X2 indicates the rotation speed laying at a value of "1.0", that is, a rotation speed $N_E$ of the engine 8 connected to the input shaft 14. The uppermost horizontal line XG indicates the rotation speed of the power transmitting member 18.

Starting from the left, three vertical lines Y1, Y2 and Y3, corresponding to the three elements forming the differential portion 11, respectively, represent relative rotation speeds of the differential-portion sun gear S0 corresponding to a second rotary element (second element) RE2, the differential-portion carrier CA0 corresponding to a first rotary element (first element) RE1, and the differential-portion ring gear R0 corresponding to a third rotary element (third element) RE3. A distance between adjacent ones of the vertical lines Y1, Y2 and Y3 is determined in accordance with the gear ratio ρ0 of the differential-portion planetary gear unit 24.

Starting from the left, five vertical lines Y4, Y5, Y6, Y7 and Y8 for the automatic shifting portion 20 represent relative rotation speeds of the first and second sun gears S1 and S2 corresponding to a fourth rotary element (fourth element) RE4 and connected to each other, the first carrier corresponding to a fifth rotary element (fifth element) RE5, the third ring gear R3 corresponding to a sixth rotary element (sixth element) RE6, the first differential-portion ring gear R0 and the second and third carriers CA2 and CA3 corresponding to a seventh rotary element (seventh element) RE7 and connected to each other, and the second ring gear R2 and the third sun gear S3 corresponding to an eighth rotary element (eighth element) RE8 and connected to each other, respectively. A distance between the adjacent ones of the vertical lines Y4 to Y8 is determined based on the gear ratios ρ1, ρ2 and ρ3 of the first to third planetary gear units 26, 28 and 30.

In the correlation between the vertical lines on the collinear chart, if an interval between the sun gear and the carrier is assigned to a distance corresponding to a value of "1", an interval between the carrier and the ring gear is assigned to a distance corresponding to the gear ratio ρ of the planetary gear unit. That is, for the differential portion 11, an interval between the vertical lines Y1 and Y2 is assigned to a distance corresponding to a value of "1" and an interval between the vertical lines Y2 and Y3 is assigned to a distance corresponding to a value of "ρ". For each of the first to third planetary gear units 26, 28 and 30 of the automatic shifting portion 20, further, an interval between the sun gear and the carrier is assigned to a distance corresponding to a value of "1" and an interval between the carrier and the ring gear is assigned to a distance corresponding to the gear ratio ρ.

Expressing the structure using the collinear chart shown in FIG. 3, the shifting mechanism 10 of the present embodiment takes the form of a structure including the power distributing mechanism 16 (continuously variable shifting portion 11). With the power distributing mechanism 16, the differential-portion planetary gear unit 24 has the first rotary element RE1 (differential-portion carrier CA0) connected to the input shaft 14, i.e., the engine 8, while selectively connected to the second rotary element RE2 (differential-portion sun gear S0) through the switching clutch C0, the second rotary element RE2 connected to the first electric motor M1 while selectively connected to the casing 12 through the switching brake B0, and the third rotary element RE3 (differential-portion ring gear R0) connected to the power transmitting member 18 and the second electric motor M2. Thus, the rotation of the input shaft 14 is transmitted (input) to the automatic shifting portion (step-variable shifting portion) 20 through the power transmitting member 18. An inclined straight line L0, passing across an intersecting point between the lines Y2 and X2, represents the correlation between the rotation speeds of the differential-portion sun gear S0 and the differential-portion ring gear R0.

For example, as the switching clutch C0 and the switching brake B0 are disengaged, the shifting mechanism 10 is switched to the continuously variable shifting state (differential state). In this case, controlling the rotation speed of the first electric motor M1 causes the rotation speed of the differential-portion sun gear S0, represented by an intersecting point between the straight line L0 and the vertical line Y1, to increase or decrease. Under such a state, if the rotation speed of the differential-portion ring gear R0, bound with the vehicle speed V, remains at a nearly fixed level, then, the rotation speed of the differential-portion carrier CA0, represented by the intersecting point between the straight line L0 and the vertical line Y2, is caused to increase or decrease.

With the switching clutch C0 being engaged to couple the differential-portion sun gear S0 and the differential-portion carrier CA0 to each other, the power distributing mechanism 16 is brought into the non-differential state where the three rotary elements are caused to integrally rotate as a unitary unit. Thus, the straight line L0 matches the lateral line X2, so that the power transmitting member 18 is caused to rotate at the same rotation speed as the engine rotation speed $N_E$. In contrast, with the switching brake B0 being engaged to halt the rotation of the differential-portion sun gear S0, the power distributing mechanism 16 is brought into the non-differential state to function as the speed increasing mechanism. Thus, the straight line L0 describes a state as shown in FIG. 3, under which the rotation of the differential-portion ring gear R0, i.e., the power transmitting member 18, represented by an intersecting point between the straight line L0 and the vertical line Y3, is input to the automatic shifting portion 20 at a rotation speed higher than the engine rotation speed $N_E$.

With the automatic shifting portion 20, the fourth rotary element RE4 is selectively connected to the power transmitting member 18 through the second clutch C2 and selectively connected to the casing 12 through the first brake B1. The fifth rotary element RE5 is selectively connected to the casing 12 through the second brake B2 and the sixth rotary element RE6 is selectively connected to the casing 12 through the third brake B3. The seventh rotary element RE7 is connected to the output shaft 22 and the eighth rotary element RE8 is selectively connected to the power transmitting member 18 through the first clutch C1.

As shown in FIG. 3, with the automatic shifting portion 20, upon engagement of the first clutch C1 and the third brake B3, the rotation speed of the output shaft 22 for the 1st-speed gear position is represented by an intersecting point between the inclined straight line L1 and the vertical line Y7 representing the rotation speed of the seventh rotary element RE7 connected to the output shaft 22. Here, the inclined straight line L1 passes across an intersecting point between the vertical line Y8, indicative of the rotation speed of the eighth rotary element RE8, and the horizontal line X2, and an intersecting point between the vertical line Y6, indicative of the rotation speed of the sixth rotary element RE6, and the horizontal line X1.

Similarly, the rotation speed of the output shaft 22 for the 2nd-speed gear position is represented by an intersecting point between an inclined straight line L2, determined upon engagement of the first clutch C1 and the second brake B2, and the vertical line Y7 indicative of the rotation speed of the seventh rotary element RE7 connected to the output shaft 22. The rotation speed of the output shaft 22 for the 3rd-speed gear position is represented by an intersecting point between an inclined straight line L3, determined upon engagement of the first clutch C1 and the first brake B1, and the vertical line Y7 indicative of the rotation speed of the seventh rotary element RE7 connected to the output shaft 22. The rotation speed of the output shaft 22 for the 4th-speed gear position is represented by an intersecting point between a horizontal line L4, determined upon engagement of the first and second clutches C1 and C2, and the vertical line Y7 indicative of the rotation speed of the seventh rotary element RE7 connected to the output shaft 22.

For the 1st-speed to 4th-speed gear positions, the switching clutch C0 remains engaged. Therefore, a drive force is applied from the differential portion 11, i.e., the power distributing mechanism 16 to the eighth rotary element RE8 at the same rotation speed as that of the engine rotation speed $N_E$. However, in place of the switching clutch C0, if the switching clutch B0 is engaged, then, the drive force is applied from the differential portion 11 to the eighth rotary element RE8 at a higher rotation speed than the engine rotation speed $N_E$. Thus, an intersecting point between a horizontal line L5 and the vertical line Y7 represents the rotation speed of the output shaft 22 for the 5th-speed gear position. Here, the horizontal line L5 is determined upon engagement of the first clutch C1, the second clutch C2 and the switching brake B0 and the vertical line Y7 represents the rotation speed of the seventh rotary element RE7 connected to the output shaft 22.

Figure 4:
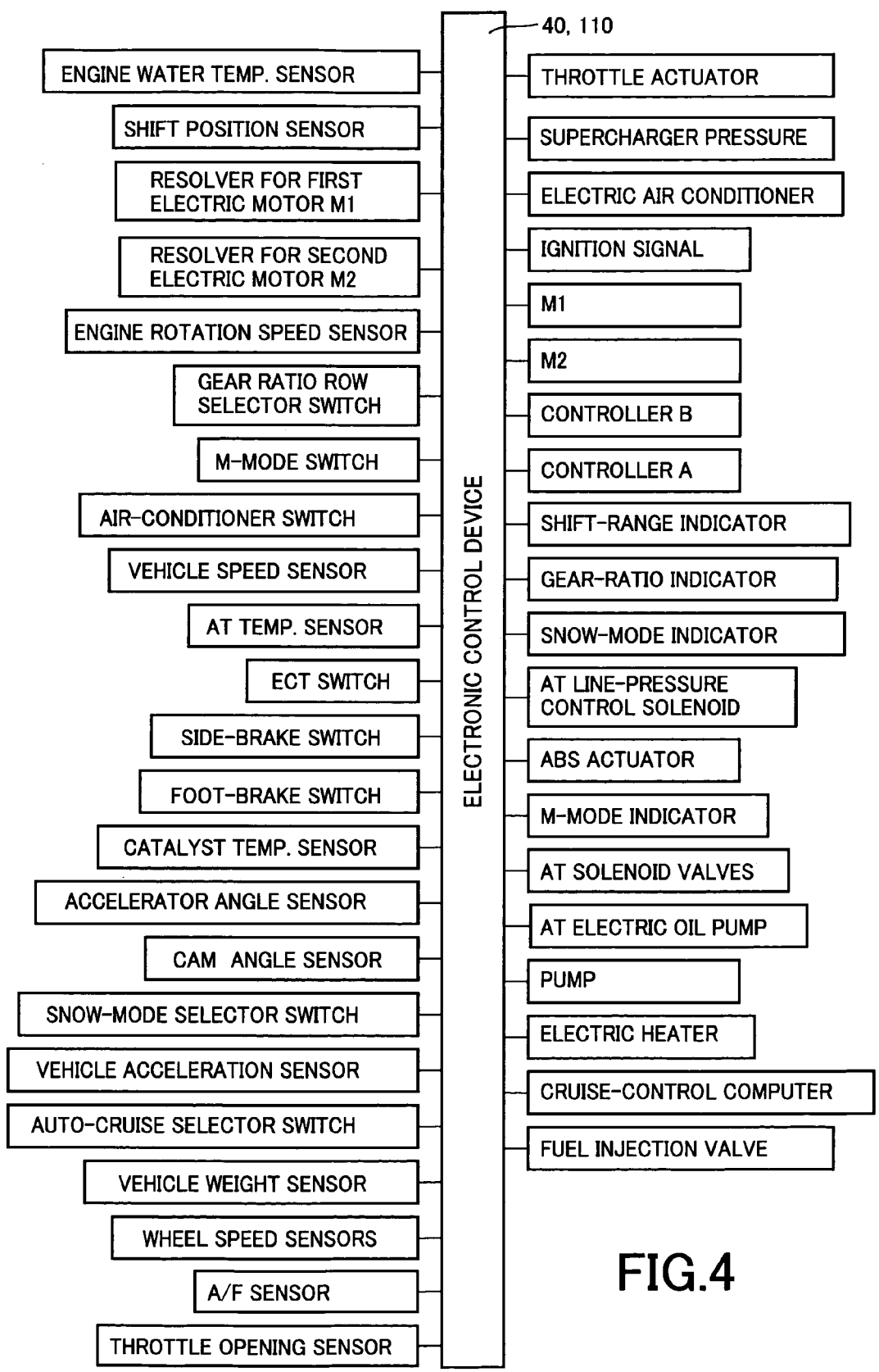
FIG. 4 is a view illustrating input and output signals to be input to or output from an electronic control device incorporated in the hybrid vehicle drive apparatus shown in FIG. 1.

FIG. 4 exemplarily shows various input signals applied to an electronic control device 40, serving as a control device for controlling the shifting mechanism 10 forming part of the hybrid vehicle drive apparatus according to the present invention, and various output signals delivered from the electronic control device 40. The electronic control device 40 includes a so-called microcomputer incorporating a CPU, a ROM, a RAM and an input/output interface. With the microcomputer operated to perform signal processing according to programs preliminarily stored in the ROM while utilizing a temporary data storage function of the ROM, hybrid drive controls are conducted to control the engine 8 and the first and second electric motors M1 and M2, while executing drive controls such as shifting controls of the automatic shifting portion 20.

The electronic control device 40 is applied with the various input signals from various sensors and switches shown in FIG. 4. These input signals include a signal indicative of an engine cooling water temperature $TEMP_W$, a signal indicative of a selected shift position $P_{SH}$, a signal indicative of a rotation speed $N_{M1}$ (hereinafter, referred to as a "first-motor rotation speed $N_{M1}$") of the first electric motor M1 detected by a rotation speed sensor such as a resolver and a rotation direction thereof, a signal indicative of a rotation speed $N_{M2}$ (hereinafter, referred to as a "second-motor rotation speed $N_{M2}$") of the second electric motor M2 detected by a rotation speed sensor 44 (refer to FIG. 1) such as a resolver and a rotation direction thereof, a signal indicative of the engine rotation speed $N_E$ representing the rotation speed of the engine 8, a signal indicative of a set value of gear ratio row, a signal commanding an "M" mode (manually shift drive mode), and an air-conditioning signal indicative of the operation of an air conditioner, etc.

Besides the input signals described above, the electronic control device 40 is further applied with other various input signals. These input signals include a signal indicative of the vehicle speed V corresponding to the rotation speed $N_{OUT}$ of the output shaft 22 and being detected by a vehicle sensor 46 (refer to FIG. 1) and advancing direction of the vehicle, a working oil temperature signal indicative of a working oil temperature of the automatic shifting portion 20, a signal indicative of a side brake being operated, a signal indicative of a foot brake being operated, a catalyst temperature signal indicative of a catalyst temperature, an accelerator opening signal indicative of a displacement value $A_{CC}$ of an accelerator pedal corresponding to an output demand value required by a driver, a cam angle signal, a snow mode setting signal indicative of a snow mode being set, an acceleration signal indicative of a fore and aft acceleration of the vehicle, an auto-cruising signal indicative of the vehicle running under an auto-cruising mode, a vehicle weight signal indicative of a weight of the vehicle, a drive wheel velocity signal indicative of a wheel velocity of each drive wheel, and a signal indicative of an air-fuel ratio A/F of the engine 8 etc.

Here, the above rotation speed sensor 44 and the vehicle speed sensor 46 are sensors which can detect the rotation speed as well as the rotation direction. When the automatic shifting portion 20 is placed in the neutral position during the vehicle running, the vehicle speed sensor 46 is used for detecting the advancing direction of the vehicle.

The electronic control device 40 generates various control signals to be applied to an engine output control device 43 (refer to FIG. 6) for controlling the engine output. These control signals include, for instance, a drive signal applied to a throttle actuator 97 for controlling an opening degree $\theta_{TH}$ of a throttle valve 96 disposed in an intake manifold 95 of the engine 8, a fuel supply quantity signal to be applied to a fuel injection device 98 for controlling the amount to fuel to be supplied to each cylinder of the engine 8, an ignition signal to be applied to an ignition device 99 for commanding an ignition timing of the engine 8, a supercharger pressure regulating signal for adjusting a supercharger pressure level, an electric air-conditioner drive signal for actuating an electric air conditioner, and command signals for commanding the operations of the first and second electric motors M1 and M2.

Besides the control signals described above, the electronic control device 40 generates various output signals. These output signals include a shift-position (selected operating position) display signal for activating a shift indicator, a gear-ratio display signal for providing a display of the gear ratio, a snow-mode display signal for providing a display of a snow mode under operation, an ABS actuation signal for actuating an ABS actuator for preventing slippages of the drive wheels during a braking effect, an M-mode display signal for displaying the M-mode being selected, valve command signals for actuating electromagnet valves incorporated in a hydraulically operated control circuit 42 (see FIG. 6) to control the hydraulic actuators of the hydraulically operated frictional engaging devices of the differential portion 11 and the automatic shifting portion 20, drive command signals for actuating a hydraulic pressure pump serving as a hydraulic pressure source of the hydraulically operated control circuit 42, a signal for driving an electric heater, and signals applied to a cruise-control computer, etc.

Figure 5:
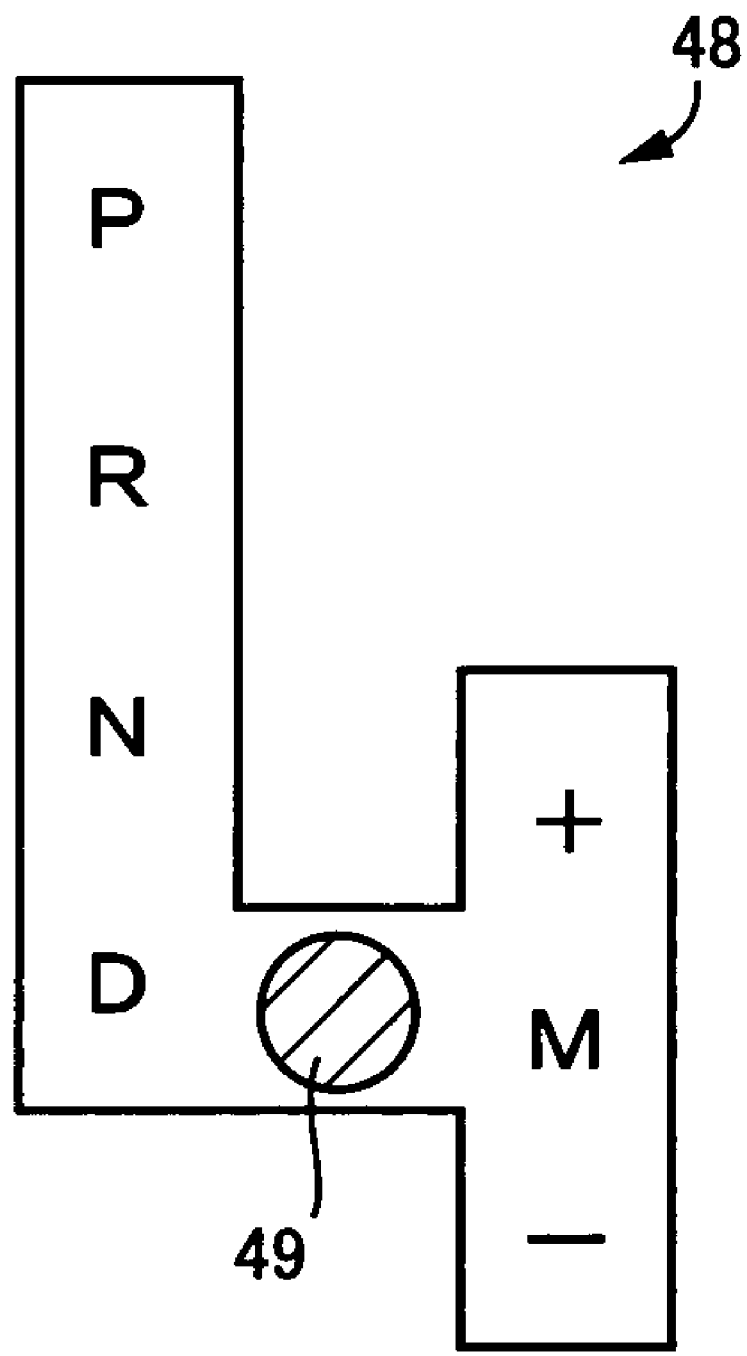
FIG. 5 is a view showing one sample of a shift operating device provided with a shift lever for operating to select one of plural kinds of shift positions.

FIG. 5 is a view showing one sample of a shift operating device 48, serving as a switching device, which is manually operated to select one of the shift positions $P_{SH}$ of multiple kinds. The shift operating device 48 includes a shift lever 49 mounted aside, for example, a driver's seat to be manually operated to select one of the shifting positions of the plural kinds.

The shift lever 49 has a structure arranged to be selectively shifted in manual operation to be set to one of a parking position "P" (Parking) under which the shifting mechanism 10, i.e., the automatic shifting portion 20, is placed in the neutral state interrupting the power transmitting path of the shifting mechanism 10, i.e., the automatic shifting portion 20, a reverse drive running position "R" (Reverse) for the vehicle to run in a reverse drive mode, a neutral position "N" (Neutral) for the neutral state to be established under which the power transmitting path of the shifting mechanism 10 is interrupted, a forward drive automatic shift position "D" (Drive) for an automatic shift control to be executed within a varying range of the total speed ratio γT that can be shifted with the shifting mechanism 10, and a forward drive manual shift position "M" (Manual) under which a manual shift running mode (manual mode) is established to set a so-called shift range that limits the shift gear positions in a high speed range during the execution of the automatic shift control.

In conjunction with the shift lever 49 being manually operated to each of the shift positions $P_{SH}$, for instance, the hydraulic control circuit 42 is electrically switched in such a way to establish each of the gear shift positions such as the reverse drive position "R", the neutral position "N" and the forward drive position "D" as shown in the engagement operation table shown in FIG. 2.

Among the various shift positions $P_{SH}$ covering "P" to "M" positions, the "P" and "N" positions represent the non-running positions selected when no intension is present to run the vehicle. For the "P" and "N" positions to be selected, both the first and second clutches C1 and C2 are disengaged, as shown in, for example, the engagement operation table of FIG. 2, and non-drive positions are selected to place the power transmitting path in the power cutoff state. This causes the power transmitting path of the automatic shifting portion 20 to be interrupted, disenabling the vehicle to be driven.

The "R", "D" and "M" positions represent running positions selected when the vehicle is caused to run. These shift positions also represent drive positions selected when switching the power transmitting path to the power transmitting state under which at least one of the first and second clutches C1 and C2 is engaged as shown in, for instance, the engagement operation table of FIG. 2. With such shifting positions selected, the power transmitting path of the automatic shifting portion 20 is connected to enable the vehicle to be driven.

More particularly, with the shift lever 49 manually operated from the "P" position or the "N" position to the "R" position, the second clutch C2 is engaged so that the power transmitting path of the automatic shifting portion 20 is switched from the power cutoff state to the power transmitting state. With the shift lever 49 manually operated from the "N" position to the "D" position, at least the first clutch C1 is engaged, causing the power transmitting path of the automatic shifting portion 20 to be switched from the power cutoff state to the power transmitting state.

With the shift lever 49 manually operated from the "R" position to the "P" position or the "N" position, the second clutch C2 is disengaged, causing the power transmitting path of the automatic shifting portion 20 to be switched from the power transmitting state to the power cutoff state. With the shift lever 49 manually operated from the "D" position to the "N" position, the first and second clutches C1 and C2 are disengaged, causing the power transmitting path of the automatic shifting portion 20 to be switched from the power transmitting state to the power cutoff state.

FIG. 6 is a functional block diagram illustrating an essential part of a control function to be performed with the electronic control device 40. In FIG. 6, step-variable shifting control means 54 functions as shifting control means for the shifting the shifting the automatic shifting portion 20. For instance, the step-variable shifting control means 54 discriminates whether to execute the shifting in the automatic shifting portion 20 on the basis of a vehicle condition represented by the vehicle speed V and the demanded output torque $T_{OUT}$ for the automatic shifting portion 20 by referring to the relationships (including the shifting diagram and the shifting map), preliminarily stored in memory means 56, which are plotted in solid lines and single dot lines as shown in FIG. 7. That is, the step-variable shifting control means 54 discriminates a shifting position to be shifted in the automatic shifting portion 20, thereby causing the automatic shifting portion 20 to execute the shifting so as to obtain the discriminated shifting position. When this takes place, the step-variable shifting control means 54 outputs a command (shifting output command) to the hydraulic control circuit 42 for engaging and/or disengaging the hydraulically operated frictional engaging devices, excepting the switching clutch C0 and the switching brake B0, so as to achieve a desired shifting position in accordance with, for instance, the engagement operation table shown in FIG. 2.

Hybrid control means 52 renders the engine 8 operative in an operating region at high efficiency under the infinitely variable shifting state of the shifting mechanism 10, i.e., the differential state of the differential portion 11. At the same time, the hybrid control means 52 causes the engine 8 and the second electric motor M2 to deliver drive forces at varying distributing rates while causing the first electric motor M1 to generate electric power at a varying rate for a reactive force to be generated at an optimum value, thereby controlling the speed ratio γ0 of the differential portion 11 placed in the electrically controlled continuously variable transmission.

For instance, during the running of the vehicle at a current vehicle speed, the hybrid control means 52 calculates a target (demanded) output of the vehicle by referring to the displacement value Acc of the accelerator pedal and the vehicle speed V that collectively represents the output demanded value intended by the driver. Then, the hybrid control means 52 calculates a demanded total target output based on the target output and a charging request value of the vehicle. In order to obtain the total target output, the hybrid control means 52 calculates a target engine output with taking account of the transmitting a loss, loads on auxiliary units and assisting torque of the second electric motor M2, etc. Then, the hybrid control means 52 controls the engine 8 so as to provide the engine rotation speed $N_E$ and engine torque $T_E$ such that the target engine output is obtained, while controlling the first electric motor M1 to generate electric power at a proper power rate.

The hybrid control means 52 executes a hybrid control with taking account of the gear position of the automatic shifting portion 20 so as to obtain power performance and improved fuel consumption. During such a hybrid control, the differential portion 11 is rendered operative to function as the electrically controlled continuously variable transmission for the purpose of matching the engine rotation speed $N_E$, determined for the engine 8 to operate at a high efficiency, to the rotation speed of the power transmitting member 18 determined based on the vehicle speed V and the selected gear position of the automatic shifting portion 20.

To this end, the hybrid control means 52 preliminarily stores therein an optimum fuel economy curve (including a fuel economy map and relevant relationship) of the engine 8 preliminarily determined on an experimental basis such that, during the running of the vehicle under the continuously variable shifting state, the vehicle has drivability and fuel economy performance in compatibility on a two-dimensional coordinate with parameters including, for instance, the engine rotation speed $N_E$ and output torque (engine torque) $T_E$ of the engine 8.

In order to cause the engine 8 to operate on such an optimum fuel economy curve, a target value on the total speed ratio $\gamma T$ of the shifting mechanism 10 is determined so as to obtain engine torque $T_E$ and the engine rotation speed $N_E$ for the demanded engine output to be generated so as to satisfy, for instance, the target output (total target output and demanded drive force). To achieve such a target value, the hybrid control means 52 controls the speed ratio $\gamma 0$ of the differential portion 11, while controlling the total speed ratio $\gamma T$ within a variable shifting range at a value, for instance, ranging from 13 to 0.5.

During such hybrid control, the hybrid control means 52 allows electric energy, generated by the first electric motor M1, to be supplied to a battery 60 and the second electric motor M2 through an inverter 58. This allows a major part of the drive force, delivered from the engine 8, to be mechanically transmitted to the power transmitting member 18 and the rest of the drive force of the engine is delivered to the first electric motor M1 to be consumed thereby for conversion to electric power. The resulting electric energy is supplied through the inverter 58 to the second electric motor M2, which in turn is driven to provide a drive force for delivery to the power transmitting member 18. Equipments, involved in the operation of generating electric energy and the operation causing the second electric motor M2 to consume electric energy, establish an electric path in which the part of the drive force, delivered from the engine 8, is converted to electric energy which in turn is converted into mechanical energy.

The hybrid control means 52 functionally includes engine output control means for executing an output control of the engine 8 so as to provide the demanded engine output. The engine output control means allows the throttle actuator 97 to perform a throttle control so as to controllably open or close the electronic throttle valve 96. In addition, the engine output control means outputs commands to the engine output control device 43 so as to cause the fuel injection device 98 to control the fuel injection quantity and fuel injection timing for performing a fuel injection control while permitting the ignition device 99, such as an igniter or the like, to control an ignition timing for an ignition timing control. These commands are output in a single mode or a combined mode. For instance, the hybrid control means 52 drives the throttle actuator 97 in response to the acceleration opening signal Acc by fundamentally referring to the preliminarily stored relationship, not shown, so as to execute the throttle control such that the greater the accelerator opening Acc, the greater will be the throttle valve opening $\theta_{TH}$.

A solid line A, shown in FIG. 7, represents a boundary line between an engine drive region and a motor drive region for the engine 8 and an electric motor, i.e., for instance, the second electric motor M2 to be selectively switched as a drive force source for the vehicle to perform a startup/running (hereinafter referred to as "running"). In other words, the boundary line is used for switching a so-called engine drive mode, in which the engine 8 is caused to act as a running drive force source for starting up/running (hereinafter referred to as "running") the vehicle, and a so-called motor drive mode in which the second electric motor M2 is caused to act as a drive force source for running the vehicle.

The preliminarily stored relationship, having the boundary line (in the solid line A) shown in FIG. 7 for the engine drive region and the motor drive region to be switched, represents one example of a drive-force source switching diagram (drive force source map), formed on a two-dimensional coordinate, which includes parameters such as the vehicle speed V and output torque $T_{OUT}$ representing a drive force correlation value. Memory means 56 preliminarily stores such a drive-force source switching diagram together with the shifting diagram (shifting map) designated by, for instance, the solid line and the single dot line in FIG. 7.

The hybrid control means 52 determines which of the motor drive region and the engine drive region is to be selected based on the vehicle condition, represented by the vehicle speed V and demanded torque output $T_{OUT}$ by referring to, for instance, the drive-force source switching diagram shown in FIG. 7, thereby executing the motor drive mode or the engine drive mode. Thus, the hybrid control means 52 executes the motor drive mode at relatively low output torque $T_{OUT}$, i.e., low engine torque $T_E$, at which an engine efficiency is generally regarded to be lower than that involved a high torque region, or a relatively low vehicle speed range of the vehicle speed V, i.e., under a low load region as will be apparent from FIG. 7.

During such a motor drive mode, the hybrid control means 52 renders the differential portion 11 operative to perform an electrical CVT function (differential function) for controlling the first-motor rotation speed NM1 at a negative rotation speed, i.e., at an idling speed to maintain the engine rotation speed $N_E$ at a zeroed or nearly zeroed level, thereby minimizing a drag of the engine 8, remained under a halted state, for providing improved fuel economy.

The hybrid control means 52 includes engine-startup stop control means 66 that switches an operating state of the engine 8 between a drive state and a stop state to select one of the engine drive mode and the motor drive mode. As used herein, the term "switches" refers to an operation in which the engine 8 is started up or stopped in operation. With the hybrid control means 52 executed the operation based on the vehicle condition by referring to, for instance, the drive-force source switching diagram shown in FIG. 7 to determine that the motor drive mode and the engine drive mode need to be switched, the engine-startup stop control means 66 executes the operation to start up or stop the engine 8.

If the accelerator pedal is depressed in operation to cause an increase in demanded engine output torque $T_{OUT}$, the vehicle condition varies from the motor drive region to the engine drive region as shown by a transition in points "a"→"b" on a solid line B in FIG. 7. When this takes place, the engine-startup stop control means 66 turns on the first electric motor M1 to raise the first-motor rotation speed $N_{M1}$. That is, the first electric motor M1 is rendered operative to function as a starter. This allows the engine 8 to start up with an increase in the engine rotation speed $N_E$. During such operation, the engine-startup stop control means 66 causes the ignition device 99 to initiate an ignition at a given engine rotation speed $N_E'$, i.e., for instance, at an engine rotation speed $N_E$ enabling an autonomous rotation, after which the hybrid control means 52 switches the motor drive mode to the engine drive mode.

During such operation, the engine-startup stop control means 66 may cause the first-motor rotation speed $N_{M1}$ to immediately raise for increasing the engine rotation speed $N_E$ up to the given engine rotation speed $N_E'$. This can immediately avoid the occurrence of a resonating region from an engine rotating speed region remaining below an idling rotation speed $N_{EIDL}$ that is well known, thereby suppressing the possibility of the engine 8 vibrating at startup thereof.

In the normal operation, the second electric motor M2 can be rotated only in one direction, while the first electric motor M1 can be rotated in both directions i.e. normal direction and reverse direction. The rotation direction of the first electric motor M1 which is the same as that of the second electric motor M2 is defined as the normal direction. Accordingly, during rotation of the first electric motor M1 in the reverse direction, when the rotation speed $N_{M1}$ of the first electric motor M1 approaches zero, value thereof increases if the rotation direction (positive/negative of the rotation direction) is considered.

This is expressed as raising the first-motor rotation speed $N_{M1}$.

If the accelerator pedal is released with a decrease in demanded engine output torque $T_{OUT}$, the vehicle condition varies from the engine drive region to the motor drive region as shown by another transition in points "b"→"a" on the solid line B in FIG. 7. When this takes place, the engine-startup stop control means 66 causes the fuel injection device 98 to interrupt the supply of fuel to the engine 8. That is, a fuel cutoff operation is executed to stop the engine 8. In such a way, the hybrid control means 52 switches the engine drive mode to the motor drive mode. During such an operation, the engine-startup stop control means 66 may execute the operation to immediately lower the first-motor rotation speed $N_{M1}$ for immediately lowering the engine rotation speed $N_E$ to a zeroed or nearly zeroed level. This immediately avoids the engine 8 from entering the resonating region, thereby suppressing the possibility of the engine 8 vibrating at startup thereof.

In an alternative, the engine-startup stop control means 66 may execute the operation to stop the engine 8 upon executing an operation to lower the first-motor rotation speed $N_{M1}$ to decrease the engine rotation speed $N_E$ on a stage prior to the fuel cutoff operation being executed for effectuating the fuel cutoff operation at the given engine rotation speed $N_E'$.

Further, even under the engine drive region, the hybrid control means 52 may execute the operation to allow the second electric motor M2 to be supplied with electric energy, generated by the first electric motor M1, and/or electric energy delivered from the battery 60 via the electric path mentioned above. This causes the second electric motor M2 to be driven for performing a torque assisting operation to assist the drive force of the engine 8. Thus, for the present embodiment, the vehicle driving using both the engine 8 and the second electric motor M2 as the drive force source is included, not in the motor driving but in the engine driving.

Further, the hybrid control means 52 can cause the differential portion 11 to perform the electrical CVT function through which the engine 8 can be maintained under the operating state regardless of the vehicle left in a halted condition or a low speed condition. For instance, if a drop occurs in a state of charge SOC of the battery 60 during the halt of the vehicle with a need occurring on the first electric motor M1 to generate electric power, the drive force of the engine 8 drives the first electric motor M1 to generate electric power with an increase in the rotation speed of the first electric motor M1. Thus, even if the second-motor rotation speed $N_{M2}$, uniquely determined with the vehicle speed V, is zeroed (nearly zeroed) due to the halted condition of the vehicle, the power distributing mechanism 16 performs the differential action, causing the engine rotation speed $N_E$ to be maintained at a level beyond an autonomous rotation speed.

The hybrid control means 52 executes the operation to cause the differential portion 11 to perform the electrical CVT function for controlling the first-motor rotation speed $N_{M1}$ and the second-motor rotation speed $N_{M2}$ to maintain the engine rotation speed $N_E$ at an arbitrary level regardless of the vehicle remaining under the halted or running state. As will be understood from the collinear chart shown in FIG. 3, for instance, when raising the engine rotation speed $N_E$, the hybrid control means 52 executes the operation to maintain the second-motor rotation speed $N_{M2}$, bound with the vehicle speed V, at a nearly fixed level while raising the first-motor rotation speed $N_{M1}$.

In placing the shifting mechanism 10 in the step-variable shifting state, increasing-speed gear-position determining means 62 determines which of the switching clutch C0 and the switching brake B0 is to be engaged. To this end, the increasing-speed gear-position determining means 62 executes the operation based on, for instance, the vehicle condition according to the shifting diagram, shown in FIG. 7, which is preliminarily stored in the memory means 56, to determine whether or not a gear position to be shifted in the shifting mechanism 10 is an increasing-speed gear position, i.e., for instance, a 5th-speed gear position.

Switching control means 50 switches the engaging and/disengaging states of the differential-state switching means (switching clutch C0 and switching brake B0) based on the vehicle condition, thereby selectively executing a switchover between the continuously variable shifting state and the step-variable shifting state, i.e., between the differential state and the locked state. For instance, the switching control means 50 executes the operation based on the vehicle condition, represented with the vehicle speed V and demanded output torque $T_{OUT}$, by referring to the relationships (shifting diagram and shifting map), preliminarily stored in the memory means 56, which are shown in the broken line and the double dot line in FIG. 7, thereby determining whether to switch the shifting state of the shifting mechanism 10 (differential portion 11). That is, the operation is executed to determine whether there exist a continuously variable shifting control region for the shifting mechanism 10 to be placed in the continuously variable shifting state or a step-variable shifting control region for the shifting mechanism 10 to be placed in the step-variable shifting state. This allows the operation to be executed for determining the shifting state to be switched in the shifting mechanism 10, thereby executing the operation to selectively switch the shifting state to one of the continuously variable shifting state and the step-variable shifting state.

More particularly, if the determination is made that the shifting mechanism 10 lies in the step-variable shifting control region, then, the switching control means 50 outputs a signal to the hybrid control means 52 for disenabling or interrupting the hybrid control or the continuously variable shifting control, while permitting the step-variable shifting control means 54 to perform the shifting for the step-variable shifting operation that has been preliminarily determined. When this takes place, the step-variable shifting control means 54 allows the automatic shifting portion 20 to perform the automatic shifting in accordance with, for instance, the shifting diagram shown in FIG. 7 and preliminarily stored in the memory means 56.

For instance, the engagement operation table, shown in FIG. 2 and preliminarily stored in the memory means 56, represents the operations in combination of the hydraulically operated frictional engaging devices, that is, the clutches C0, C1 and C2 and the brakes B0, B1, B2 and B3 to be selected in such a shifting operation. That is, a whole of the shifting mechanism 10, i.e., the differential portion 11 and the automatic shifting portion 20, functions as a so-called step-variable automatic transmission, thereby establishing the gear positions according to the engagement operation table shown in FIG. 2.

For instance, if the increasing-speed gear-position determining means 62 determines that the 5th-gear position is to be selected, the shifting mechanism 10 as a whole can obtain a so-called overdrive-gear position on an increasing-speed gear position with a speed ratio less than "1.0" as a whole. To this end, the switching control means 50 outputs a command to the hydraulic control circuit 42 for disengaging the switching clutch C0 and engaging the switching brake B0 to allow the differential portion 11 to function as an auxiliary power transmission with a fixed speed ratio $\gamma 0$, i.e., for instance, the speed ratio $\gamma 0$ equal to "0.7".

If the increasing-speed gear-position determining means 62 determines that no 5th-gear position is to be selected, the shifting mechanism 10 as a whole can obtain a decreasing-speed gear position with a speed ratio of "1.0" or more. To this end, the switching control means 50 outputs another command to the hydraulic control circuit 42 for engaging the switching clutch C0 and disengaging the switching brake B0 to allow the differential portion 11 to function as the auxiliary power transmission with the fixed speed ratio $\gamma 0$, i.e., for instance, the speed ratio $\gamma 0$ equal to "1".

Thus, the switching control means 50 causes the shifting mechanism 10 to be switched in the step-variable shifting state under which the operation is executed to selectively switch the gear positions of two kinds to either one gear position. With the differential portion 11 rendered operative to function as the auxiliary power transmission while the automatic shifting portion 20, connected to the differential portion 11 in series, is rendered operative to function as the step-variable transmission, the shifting mechanism 10 as a whole is rendered operative to function as the so-called step-variable automatic transmission.

On the contrary, if the switching control means 50 determines that the shifting mechanism 10 remains in the continuously variable shifting control region to be switched in the continuously variable shifting state, the shifting mechanism 10 as a whole can obtain the continuously variable shifting state. To this end, the switching control means 50 outputs a command to the hydraulic control circuit 42 for disengaging both the switching clutch C0 and the switching brake B0 so as to place the differential portion 11 in the continuously variable shifting state to enable an infinitely variable shifting operation to be executed. Simultaneously, the switching control means 50 outputs a signal to the hybrid control means 52 for permitting the hybrid control to be executed, while outputting a given signal to the step-variable shifting control means 54. As used herein, the term "given signal" refers to a signal, by which the shifting mechanism 10 is fixed to a gear position for a predetermined continuously variable shifting state, or a signal for permitting the automatic shifting portion 20 to perform the automatic shifting according to, for instance, the shifting diagram, shown in FIG. 7, which is preliminarily stored in the memory means 56.

In this case, the step-variable shifting control means 54 performs the automatic shifting upon executing the operation excepting the operations to engage the switching clutch C0 and the switching brake B0 in the engagement operation table shown in FIG. 2. This causes the switching control means 50 to switch the differential portion 11 to the continuously variable shifting state to function as the continuously variable transmission, while rendering the automatic shifting portion 20, connected to the differential portion 11 in series, operative to function as the step-variable transmission. This allows a drive force to be obtained with an appropriate magnitude. Simultaneously, the rotation speed input to the automatic shifting portion 20, i.e., the rotation speed of the power transmitting member 18 is continuously varied for each gear position of the 1st-speed, 2nd-speed, 3rd-speed and 4th-speed positions of the automatic shifting portion 20, enabling the respective gear positions to be obtained in infinitely variable speed ratio ranges. Accordingly, since the speed ratio is continuously variable across the adjacent gear positions, the shifting mechanism 10 as a whole can obtain the overall speed ratio $\gamma T$ in an infinitely variable mode.

Now, FIG. 7 will be described more in detail. FIG. 7 is a view showing the relationships (shifting diagram and shifting map), preliminarily stored in the memory means 56, based on which the shifting of the automatic shifting portion 20 is determined, and representing one example of the shifting diagram plotted on a two-dimensional coordinate with parameters including the vehicle speed V and demanded output torque $T_{OUT}$ indicative of the drive force correlation value. In FIG. 7, the solid lines represent upshift lines and single dot lines represent downshift lines.

In FIG. 7, the broken lines represent a determining vehicle speed V1 and a determining output torque T1 for the switching control means 50 to determine the step-variable control region and the continuously variable control region. That is, the broken lines represent a high vehicle-speed determining line, forming a series of a determining vehicle speed V1 representing a predetermined high-speed drive determining line for determining a high speed running state of a hybrid vehicle, and a high-output drive determining line, forming a series of determining output torque T1 representing a predetermined high-output drive determining line for determining the drive force correlation value related to the drive force of the hybrid vehicle. As used herein, the term "drive force correlation value" refers to determining output torque T1 that is preset for determining a high output drive for the automatic shifting portion 20 to provide output torque at a high output.

A hysteresis is provided for determining the step-variable control region and the continuously variable control region as indicated by a double dot line in FIG. 7 in contrast to the broken line. That is, FIG. 7 represents a shifting diagram (switching map and relationship), preliminarily stored in terms of the parameters including the vehicle speed V, including the determining vehicle speed V1 and determining output torque T1, and output torque $T_{OUT}$, based on which the switching control means 50 executes the determination on a region as to which of the step-variable control region and the continuously variable control region belongs to the shifting mechanism 10.

The memory means 56 may preliminarily store the shifting map, inclusive of such a shifting diagram. Moreover, the shifting diagram may be of the type that includes at least one of the determining vehicle speed V1 and determining output torque T1 and may include a preliminarily stored shifting diagram with a parameter taking any of the vehicle speed V and output torque $T_{OUT}$.

The shifting diagram, the switching diagram or the drive-force source switching diagram or the like may be stored not in the map but in a determining formula for making comparison between a current vehicle speed V and a determining vehicle speed V1, and another determining formula or the like for making comparison between output torque $T_{OUT}$ and determining output torque T1. In this casing, the switching control means 50 places the shifting mechanism 10 in the step-variable shifting state when the vehicle condition such as, for instance, an actual vehicle speed exceeds the determining vehicle speed V1. In addition, the switching control means 50 places the shifting mechanism 10 in the step-variable shifting state when the vehicle condition such as, for instance, output torque $T_{OUT}$ of the automatic shifting portion 20 exceeds determining output torque T1.

When a malfunction or functional deterioration occurs in electrical control equipment such as an electric motor or the like used for rendering the differential portion 11 operative as the electrically controlled continuously variable transmission, the switching control means 50 may be configured to place the shifting mechanism 10 in the step-variable shifting state on a priority basis for the purpose of ensuring the running of the vehicle to even if the shifting mechanism 10 remains in the continuously variable control region. As used herein, the term "malfunction or functional deterioration in electrical control equipment" refers to a vehicle condition in which: functional degradation occurs in equipment related to the electrical path involved in the operation of the first electric motor M1 to generate electric energy and the operation executed in converting such electric energy to mechanical energy; that is, failures or functional deteriorations, caused by a breakdown or low temperature, occur in the first electric motor M1, the second electric motor M2, the inverter 58, the battery 60 and transmission paths interconnecting these component parts.

As used herein, the term "drive force correlation value" described above refers to a parameter corresponding to the drive force of the vehicle in one-to-one relation. Such a parameter may include not only drive torque or drive force delivered to the drive wheels 38 but also: output torque $T_{OUT}$ of the automatic shifting portion 20; engine output torque $T_E$; an acceleration value of the vehicle; an actual value such as engine output torque $T_E$ calculated based on, for instance, the accelerator operating or the throttle valve opening $\theta_{TH}$ (or an intake air quantity, an air/fuel ratio or a fuel injection amount) and the engine rotation speed $N_E$; or an estimated value such as engine output torque $T_E$ or demanded vehicle drive force calculated based on a displacement value of the accelerator pedal actuated by the driver or the throttle valve operating or the like. In addition, the drive torque may be calculated upon taking a differential ratio and a radius of each drive wheel 38 into consideration by referring to output torque $T_{OUT}$ or the like or may be directly detected using a torque sensor or the like. This is true for each of other torques mentioned above.

For instance, the operation of the shifting mechanism 10 under the continuously variable shifting state during the running of the vehicle at the high speed turns out a consequence of deterioration in fuel economy. The determining vehicle speed V1 is determined to a value that can render the shifting mechanism 10 operative in the step-variable shifting state during the running of the vehicle at the high speed so as to address such an issue. Further, determining torque T1 is determined to a value that prevents reactive torque of the first electric motor M1 from covering a high output region of the engine during the running of the vehicle at a high output. That is, determining torque T1 is determined to such a value depending on, for instance, a characteristic of the first electric motor M1 that is possibly mounted with a reduced maximum output in electric energy for miniaturizing the first electric motor M1.

FIG. 8 represents a switching diagram (switching map and relationship), preliminarily stored in the memory means 56, which has an engine output line in the form of a boundary line to allow the switching control means 50 to determine a region based on the step-variable control region and the continuously variable control region using parameters including the engine rotation speed $N_E$ and engine torque $T_E$. The switching control means 50 may execute the operation based on the engine rotation speed $N_E$ and engine torque $T_E$ by referring to the switching diagram shown in FIG. 8 in place of the switching diagram shown in FIG. 7. That is, the switching control means 50 may determine whether the vehicle condition, represented with the engine rotation speed $N_E$ and engine torque $T_E$, lies in the step-variable control region or the continuously variable control region.

Further, FIG. 8 is also a conceptual view based on which the broken line in FIG. 7 is to be created. In other words, the broken line in FIG. 7 is also a switching line rewritten on a two-dimensional coordinate in terms of the parameters including the vehicle speed V and output torque $T_{OUT}$ based on the relational diagram (map) shown in FIG. 8.

As indicated on the relationships shown in FIG. 7, the step-variable control region is set to lie in a high torque region, where output torque $T_{OUT}$ is greater than the predetermined determining output torque T1, or a high vehicle speed region where the vehicle speed V is greater than the predetermined determining vehicle speed V1. Therefore, a step-variable shift drive mode is effectuated in a high drive torque region, where the engine 8 operates at relatively high torque, or the vehicle speed remaining in a relatively high speed region. Further, a continuously variable shift drive mode is effectuated in a low drive torque region, where the engine 8 operates at relatively low torque, or the vehicle speed remaining in a relatively low speed region, i.e., during a phase of the engine 8 operating in a commonly used output region.

As indicated by the relationship shown in FIG. 8, similarly, the step-variable control region is set to lie in a high-torque region with engine torque $T_E$ exceeding a predetermined given value TE1, a high-speed rotating region with the engine rotation speed $N_E$ exceeding a predetermined given value NE1, or a high output region where the engine output calculated, based on engine torque $T_E$ and the engine rotation speed $N_E$, is greater than a given value. Therefore, the step-variable shift drive mode is effectuated at relatively high torque, relatively high rotation speed or relatively high output of the engine 8. The continuously variable shift drive mode is effectuated at relatively low torque, relatively low rotation speed or relatively low output of the engine 8, i.e., in the commonly used output region of the engine 8. The boundary line, shown in FIG. 9, between the step-variable control region and the continuously variable control region corresponds to a high vehicle-speed determining line which is a series of a high vehicle-speed determining line and a high-output drive determining value which is a series of a high-output drive determining value.

With such a boundary line, for instance, during the running of the vehicle at a low/medium speed and low/medium output, the shifting mechanism 10 is placed in the continuously variable shifting state to ensure the vehicle to have improved fuel economy performance. During the running of the vehicle at a high speed with an actual vehicle speed V exceeding the determining vehicle speed V1, the shifting mechanism 10 is placed in the step-variable shifting state to act as the step-variable transmission. In this moment, the output of the engine 8 is transferred to the drive wheels 38 mainly through a mechanical power transmitting path. This suppresses a loss in conversion between the drive force and electric energy, generated when the shifting mechanism 10 is caused to act as the electrically controlled continuously variable transmission, providing improved fuel consumption.

During the running of the vehicle on the high output drive mode with the drive force correlation value, such as output torque $T_{OUT}$ or the like, which exceeds determining torque T1, the shifting mechanism 10 is placed in the step-variable shifting state to act as the step-variable transmission. In this moment, the output of the engine 8 is transferred to the drive wheels 38 mainly through the mechanical power transmitting path. In this case, the electrically controlled continuously variable transmission is caused to operate in the low/medium speed running region and the low/medium output running region of the vehicle. This enables a reduction in the maximum value of electric energy to be generated by the first electric motor M1, i.e., electric energy to be transmitted by the first electric motor M1, thereby causing the first electric motor M1 per se or a vehicle drive apparatus including such a component part to be further miniaturized in structure.

According to another viewpoint, further, during the running of the vehicle on such a high output drive mode, the driver places more emphasis on a requirement for the drive force and less emphasis on a requirement for a mileage and, thus, the shifting mechanism 10 is switched to the step-variable shifting state (fixed shifting state) rather than to the continuously variable shifting state. With such a switching operation, the driver can enjoy a fluctuation in the engine rotation speed $N_E$, i.e., a rhythmical variation in the engine rotation speed $N_E$ caused by the upshifting in the step-variable automatic shift running mode as shown, for instance, in FIG. 10.

Thus, the differential portion 11 (shifting mechanism 10) of the present embodiment can be selectively switched to one of a continuously variable shifting state and a step-variable shifting state (fixed shifting state). The switching control means 50 determines a shifting state of the differential portion 11 to be switched based on a vehicle condition, upon which the differential portion 11 is selectively switched to one of the continuously variable shifting state and the step-variable shifting state. With the present embodiment, further, the hybrid control means 52 executes a motor drive mode or an engine drive mode based on the vehicle condition. In this moment, for the motor drive mode and the engine drive mode to be switched, the engine-startup control means 66 executes the operation for starting up or halting the engine 8.

Here, the engine 8 is basically fueled with gasoline and ethanol may be blended to gasoline fuel at a certain mixing ratio. In such case, the characteristics, such as volatile or the like, of fuel are different with a resultant affect on startability of the engine. Therefore, a need arises for altering a control of starting up the engine 8 depending on the fuel type in use.

Therefore, if ethanol is blended to fuel of the engine 8, then a control is executed for avoiding such ethanol blend fuel from adversely affecting startability of the engine 8 mounted on a hybrid vehicle. Hereunder, description will be made of such a control operation.

Turning back to FIG. 6, fuel supply determining means 80 makes a query as to whether fuel in a fuel tank 70 of the hybrid vehicle increases. This is because if no fuel in the fuel tank 70 increases, no mixing ratio of ethanol is altered with no probability of alteration in the fuel type. More particularly, the presence/absence of an increase in fuel in the fuel tank 70 can be determined in response to a signal delivered from a fuel gauge 72 adapted to detect the amount of oil in, for instance, the fuel tank 70. In addition, when the fuel tank 70 is fuelled, a fueling port lid 74 for closing a fueling port of the fuel tank 70 is opened. Thus, the fuel supply determining means 80 may determines that upon detecting the fueling port lid 74 being opened, fuel in the fuel tank 70 increases.

The power transmitting member 18, the first electric motor M1 and the engine 8 are connected to each other via the differential-portion gear unit 24. Thus, if the shifting mechanism 10 is placed in a continuously variable shifting state during the engine drive mode, then the first electric motor M1 outputs reactive torque in opposition to engine torque $T_E$ for causing the power transmitting member 18 to rotate at a given rotation speed. Accordingly, if such reactive torque is determined, then engine torque $T_E$ can be derived. To this end, torque detecting means 82 detects engine torque $T_E$ based on reactive torque of the first electric motor M1.

To describe this in more detail, the torque detecting means 82 detects output torque $T_{M1}$ (hereinafter referred to as "first-motor torque $T_{M1}$"), i.e. reactive torque of the first electric motor M1 based on an electric current flowing through the first electric motor M1 obtained based on a control quantity applied to an inverter 58. Subsequently, engine torque $T_E$ is calculated based on such first-motor torque $T_{M1}$ and a gear ratio $\rho 0$ or the like. For instance, if engine torque $T_E$ and first-motor torque $T_{M1}$ are not zeroed but remain under a status balanced with each other, i.e. under a steady-state running mode, then engine torque $T_E$ is calculated based on a formula (1) listed below. Also, a minus sign is present on a right side of the formula (1) because first-motor torque $T_{M1}$ is oriented in a direction opposite to engine torque $T_E$.

$$T_E = -T_{M1} \times (1+\rho 0)/\rho 0 \tag{1}$$

Figure 9:
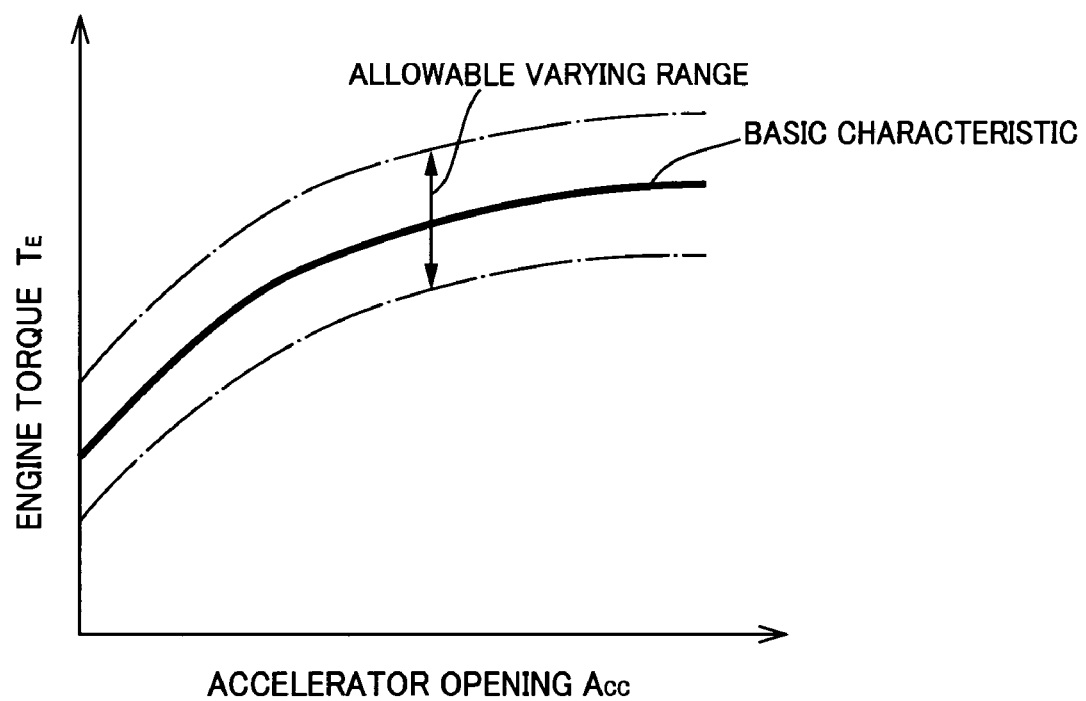
FIG. 9 is a graph showing the relationship between engine torque and an accel-opening when using gasoline as fuel supplied to the engine shown in FIG. 1.

FIG. 9 is a graph showing the relationship between engine torque $T_E$ and an accelerator-opening Acc when fuelled with gasoline. In FIG. 9, a thick solid line represents a basic characteristic based on which an allowable varying range is determined. The shifting mechanism 10 is designed in view of the fact that the relationship between engine torque $T_E$ and the accelerator-opening Acc is variable within such an allowable varying range shown in FIG. 9. If ethanol is blended to gasoline fuelled to the engine 8 with the alteration on the fuel type, the relationship between engine torque $T_E$ and the accelerator-opening Acc is deviated from the basic characteristic mentioned above.

Fuel-alteration determining means 84 preliminarily stores the basic characteristic, shown in FIG. 9, as a characteristic representing a case in which, for instance, only gasoline is used as fuel. Thus, if the relationship between engine torque $T_E$, detected with the torque detecting means 82, and the accelerator-opening Acc exceeds a given range, taken in consideration of variation in properties of gasoline, to be deviated from the basic characteristic, then an affirming determination is made that the fuel type is altered. If, for instance, ethanol is mixed to gasoline by a given amount, then there is a tendency that fuel has an increasing octane rating. If the octane rating increases, then knocking is hard to occur. Therefore, the engine 8 is controllably ignited at early ignition timing so as to allow engine torque $T_E$ to be deviated in an incrementing direction with the accelerator-opening Acc remained constant.

The relationship between the amount of deviation, occurring in the relationship between actual engine torque $T_E$ and the accelerator-opening Acc with respect to the basic characteristic, and the fuel type, i.e. the mixing ratio of ethanol is preliminarily obtained on experimental tests. Fuel-type determining means 86 preliminarily stores the relationship between the fuel type, preliminarily obtained on experimental tests, and engine torque $T_E$. If the fuel-alteration determining means 84 makes an affirming determination that the fuel type is altered, the fuel-type determining means 86 estimates to determine the fuel type, i.e., the mixing ratio of ethanol based on engine torque $T_E$, detected by the torque detecting means 82. More particularly, the fuel-type determining means 86 estimates to determine the fuel type, i.e., the mixing ratio of ethanol, based on the amount of deviation of the relationship between engine torque $T_E$ and the accelerator-opening Acc with respect to the basic characteristic.

With the fuel-alteration determining means 84 made a positive determination, engine-startup control means 88 alters a reactive control, representing an operation of the second electric motor M2 to control reactive torque in opposition to rotational resistance of the engine 8 during engine startup, based on the fuel type used in operating the engine 8 and determined by the fuel-type determining means 86. A correlation exists between reactive torque of the second electric motor M2 representing output torque $T_{M2}$ (hereinafter referred to as "second-motor torque $T_{M2}$") of the second electric motor M2, and the engine rotation speed $N_E$. To express such a correlation with a focus on the engine rotation speed $N_E$, the engine-startup control means 88 alters an engine rotation speed control, representing the operation of the second electric motor M2 to control the engine rotation speed $N_E$ during engine startup, based on the fuel type used in operating the engine 8 determined by the fuel-type determining means 86.

Further, when starting up the engine 8, the engine-startup control means 88 executes the reactive control and the engine rotation speed control both of which are altered, thereby starting up the engine 8. More particularly, here, the alteration on the reactive control is to increase output torque of the second electric motor M2 and/or extend time required for the second electric motor M2 to generate reactive torque when degradation occurs in startability of the engine 8 because of the alteration in the fuel type, i.e. an increase in the mixing ratio of ethanol. In other words, the alteration on the reactive control is to perform the control such that the lower the startability of the engine 8 caused by the alteration of the fuel type, the greater will be the reactive torque of the second electric motor M2 and/or the longer will be the time for the second electric motor M2 to generate reactive torque.

In particular, the alteration on the engine rotation speed control is to increase a first-motor rotating acceleration $A_{M1}$, representing a variation rate (increasing rate) of a first-motor rotation speed $N_{M1}$ per unit time, and/or to increase a target rotation speed $N_{AM1}$ of the first electric motor M1 when increasing the first-motor rotation speed $N_{M1}$ for startup of the engine. In other words, the alteration on the engine rotation speed control is to perform a control such that the lower the startability of the engine 8 caused by the alteration of the fuel type, the greater will be the first-motor rotating acceleration $A_{M1}$ and/or the higher will be the target rotation speed $N_{AM1}$ of the first electric motor M1.

If the fuel-alteration determining means 84 makes a negative determination, further, the engine-startup control means 88 does not alter the reactive control and the engine rotation speed control.

The torque detecting means 82, the fuel-alteration determining means 84, the fuel-type determining means 86 and the engine-startup control means 88 may be executed regardless of the determination made by the fuel-supply determining means 80. However, in order to reduce a control load of the electronic control device 40, these means may be executed only when the fuel-supply determining means 80 makes the positive determination.

Figure 10:
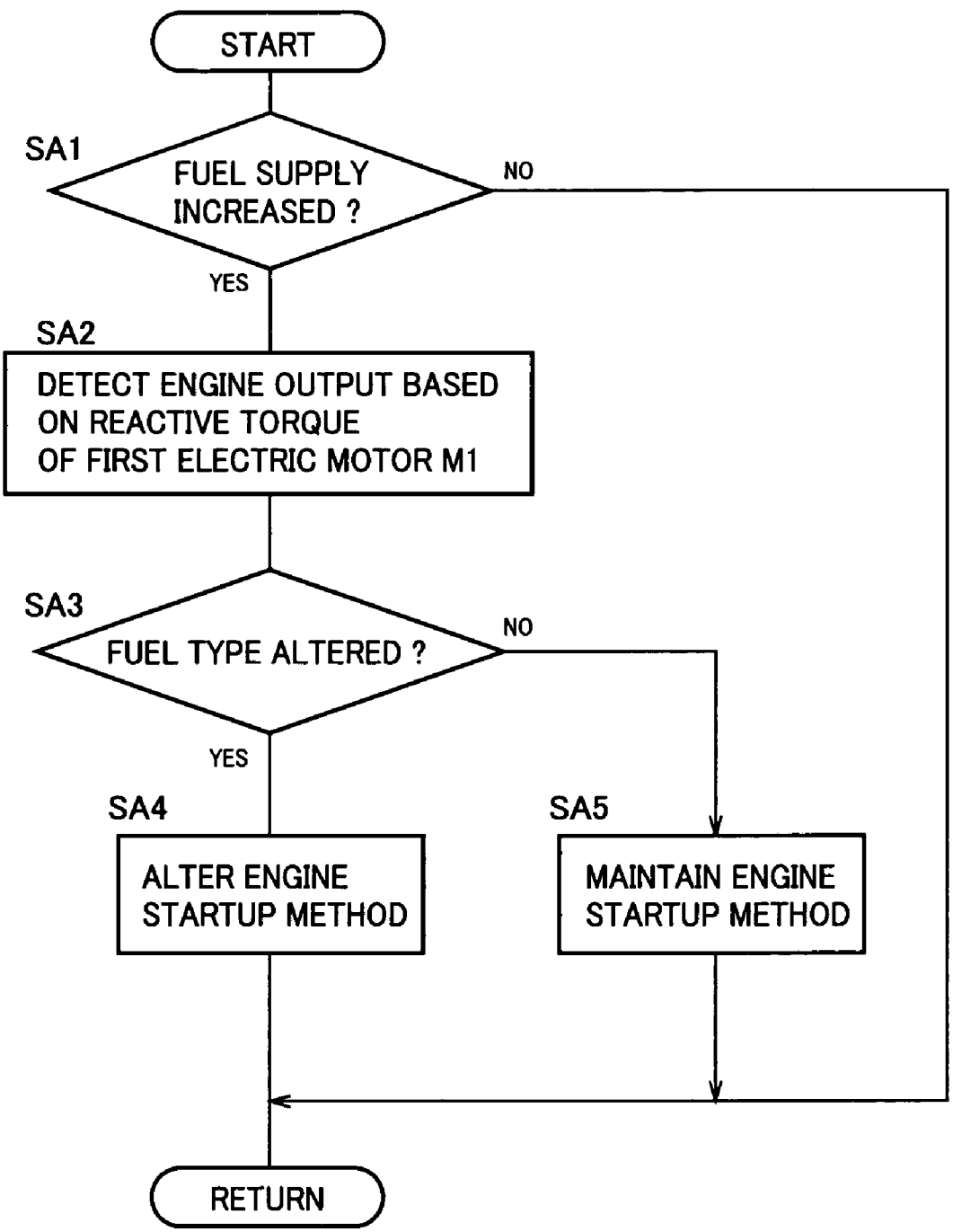
FIG. 10 is a flow chart illustrating a basic sequence of major control operations, i.e., control operations to be executed with the electronic control device shown in FIG. 4 for suppressing the occurrence of degradation in startability of the engine when ethanol is blended to fuel.

FIG. 10 is a flow chart illustrating a major part of control operations to be executed with the electronic control device 40, i.e. a basic sequence of control operations for suppressing degradation in startability of the engine 8 with ethanol being mixed to fuel. The control operations are repeatedly executed for an extremely short period in the order of, for instance, several milliseconds to several tens milliseconds.

First, at step (hereinafter the term "step" will be omitted) SA1 corresponding to the fuel-supply determining means 80, a query is made as to whether fuel in the fuel tank 70 of the hybrid vehicle increases. If the answer is YES, i.e. if fuel in the fuel tank 70 of the hybrid vehicle increases, then the control routine goes to SA2. If, on the other hand, the answer is NO, then the control operations in this flow chart are completed.

More particularly, the fuel gauge 72 detects, for instance, an oil quantity of the fuel tank 70 to generate a signal, based on which a query is made as to whether fuel in the fuel tank 70 increases. In addition, since the fueling port lid 74 of the fuel tank 70 is opened when fueling the fuel tank 70, an alternative may be made such that detecting the opening of the fueling port lid 74 enables a determination to be made that fuel in the fuel tank 70 increases.

At SA2 corresponding to the torque detecting means 82, first-motor torque $T_{M1}$ representing reactive torque is detected based on a current flowing through the first electric motor M1, upon which engine torque $T_E$ is calculated by referring to such first-motor torque $T_{M1}$ and the gear ratio $\rho 0$ or the like. In particular, under a circumstance where engine torque $T_E$ and first-motor torque $T_{M1}$ are not zeroed but remain in balanced state, i.e. during the steady-state running state, engine torque $T_E$ can be calculated using the formula (1) described above.

At SA3 corresponding to the fuel-alteration determining means 84 and the fuel-type determining means 86, a query is made as to whether the relationship between engine torque $T_E$, calculated at SA2, and the accelerator-opening Acc is deviated from the preliminarily stored basic characteristic, shown in FIG. 9, in excess of a given range based on variation in properties of gasoline. If the relationship is deviated in excess of such a given range, then a determination is made that ethanol is mixed to fuel, thereby making a determination affirming that the fuel type is altered.

If the answer to this determination is YES, then the operation is executed to estimate and determine the fuel type, i.e. the mixing ratio of ethanol based on the amount of deviation of the relationship between engine torque $T_E$, calculated at SA2, and the accelerator-opening Acc with respect to the basic characteristic. For instance, the relationship between the amount of deviation of the relationship between actual engine torque $T_E$ and the accelerator-opening Acc with respect to the basic characteristic, described above, and the mixing ratio of ethanol is obtained on experimental tests.

With the relationship obtained on such experimental tests preliminarily stored, the mixing ratio of ethanol can be estimated based on such a stored relationship.

At SA3, if the answer is YES, then the operation is executed at SA4 to alter the reactive control for startup of the engine based on the fuel type, determined at SA3, which is used in operating the engine 8. In another expression, the operation is executed to alter the engine rotation speed control for startup of the engine. That is, an engine startup control is altered to controllably increase the engine rotation speed $N_E$ for startup of the engine 8.

At SA3, if the answer is No, then none of the reactive control and the engine rotation speed control is altered. Also, SA4 and SA5 collectively correspond to the engine-startup control means 88.

Figure 11:
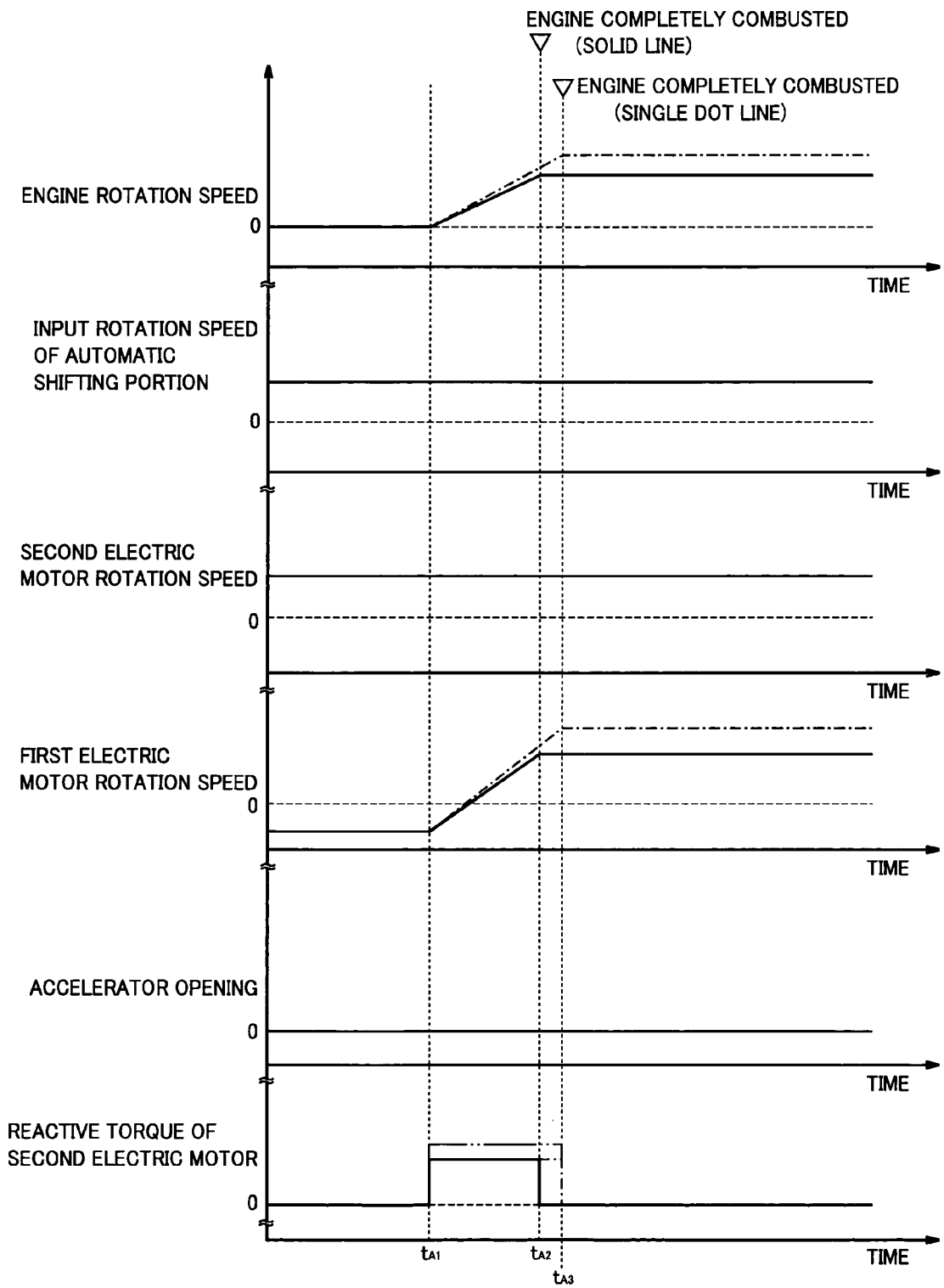
FIG. 11 is a timing chart, illustrating an engine startup control when a positive determination is made at SA3 among the control operations shown in the flow chart of FIG. 10, which represents an exemplary case wherein the engine is started up during a non-shifting mode of an automatic shifting portion under a motor drive region after the fuel type is altered to ethanol blend fuel.

FIG. 11 is a timing chart, illustrating the engine startup control executed when the answer is YES at SA3 in the control operations shown in the flow chart of FIG. 10, which represents an exemplary case wherein after the fuel type is altered to ethanol blend fuel, the engine 8 is caused to start up during a non-shifting mode of the automatic shifting portion 20 in the motor drive mode. In the timing chart shown in FIG. 11, the engine rotation speed $N_E$, the input rotation speed of the automatic shifting portion 20 and reactive torque of the second electric motor M2 are listed in a top-to-bottom ranking. In the illustrated embodiment, the input rotation speed of the automatic shifting portion 20 and the second-motor rotation speed $N_{M2}$ are equal to each other.

In FIG. 11, time $T_{A1}$ represents that for startup of the engine, the first-motor rotation speed $N_{M1}$ is raised in the same direction as that in which the second electric motor M2 rotates whereby the engine rotation speed $N_E$ begins to increase. When this takes place, the automatic shifting portion 20 remains under the non-shifting mode and, hence, no variation takes place in the second-motor rotation speed $N_{M2}$ bound with the vehicle speed V. However, reactive torque of the second electric motor M2 is caused to increase so as to prevent the second-motor rotation speed $N_{M2}$ from decreasing due to rotational resistance of the engine 8.

Further, with the power distributing mechanism 16 placed in the differential state, the first and second electric motors M1 and M2 increase the engine rotation speed $N_E$. Under such a condition, a need arises to rapidly increase the engine rotation speed $N_E$ upon increasing reactive torque of the second electric motor M2. To this end, also required is to increase reactive torque of the first electric motor M1 depending on reactive torque of the second electric motor M2. In this case, increasing reactive torque of the first electric motor M1 results in an increase in the first-motor rotating acceleration $A_{M1}$. Stated another way, if an attempt is made to increase the first-motor rotating acceleration $A_{M1}$ with a view to rapidly increasing the engine rotation speed $N_E$, there is a need for increasing reactive torque of the first electric motor M1. With reactive torque of the first electric motor M1 caused to increase, the second electric motor M2 needs to increase reactive torque depending on the increment in reactive torque of the first electric motor M1.

Time $t_{A2}$, shown in FIG. 11, indicates a phase in which no fuel type is altered, i.e. a fuel is gasoline to which no ethanol is mixed, and the engine 8 is ignited to initiate a complete combustion. Accordingly, at time $t_{A2}$ and later, the engine rotation speed $N_E$ and the first-motor rotation speed $N_{M1}$ are kept constant as indicated by solid lines, respectively, and reactive torque of the second electric motor M2 is returned to the same level as that achieved before the engine rotation speed $N_E$ is raised.

Time $t_{A3}$, shown in FIG. 11, indicates a phase in which the fuel type is altered to ethanol blend fuel under which the engine 8 is ignited to initiate a complete combustion. Accordingly, at time $t_{A3}$ and later, the engine rotation speed $N_E$ and the first-motor rotation speed $N_{M1}$ are kept constant, as indicated by single dot lines, respectively, and reactive torque of the second electric motor M2 is returned to the same level as that achieved before the engine rotation speed $N_E$ is raised.

As set forth above, if the fuel type is altered to ethanol blend fuel, the engine 8 has degraded startability. In this case, the reactive control and the engine rotation speed control are executed in altered modes to start up the engine 8. To this end, the time, required for reactive torque of the second electric motor M2 to increase is ended at time $t_{A2}$, is extended to time $t_{A3}$. As a result, reactive torque of the second electric motor M2 is caused to increase to be greater than torque (indicated by a solid line) with no alteration in the fuel type as indicated by a double dot line.

The first-motor rotating acceleration $A_{M1}$, representing a variation rate (increasing rate) of the first-motor rotation speed $N_{M1}$ per unit time as indicated by a single dot line, marks a higher level than that (indicated by a solid line) achieved when no fuel type is altered. The target rotation speed $NA_{M1}$ of the first electric motor M1, corresponding to the first-motor rotation speed $N_{M1}$ for the complete combustion of the engine 8, marks a higher level than that (indicated by a solid line) achieved when no fuel type is altered.

The present embodiment has various advantageous effects (A1) to (A17) as listed below.

(A1) The fuel-type alteration determining means 86 determines the fuel type used in operating the engine 8. The reactive control is modified based on the determined fuel type to control reactive torque of the second electric motor M2 in opposition to rotational resistance of the engine 8 during startup of the engine. Therefore, second-motor torque (reactive torque) $T_{M2}$, increasing the engine rotation speed $N_E$ for startup of the engine, is regulated based on the fuel type. This allows fuel, compressed and expanded in the engine 8, to increase in temperature to a level available to achieve the ignition, thereby precluding the occurrence of degradation in startability of the engine 8 caused by the alteration of the fuel type supplied to the engine 8.

(A2) The alteration on the reactive control of the second electric motor M2 is to increase second-motor torque (reactive torque) $T_{M2}$ when degradation occurs in startability of the engine 8 due to the alteration in the fuel type, i.e. the increase in the mixing ratio of ethanol. Accordingly, if degradation occurs in startability of the engine 8, the engine rotation speed $N_E$ is caused to rapidly increase. This allows fuel compressed and expanded in the engine 8 to reach the high temperature available to initiate the ignition, thereby suppressing the occurrence of degradation in startability of the engine 8.

(A3) The alteration on the reactive control of the second electric motor M2 is to increase second-motor torque (reactive torque) $T_{M2}$ with a decrease in startability of the engine 8. As a consequence, as startability of the engine decreases, the engine rotation speed $N_E$ is caused to rapidly increase. This allows fuel compressed and expanded in the engine 8 to increase in temperature to the level available to achieve the ignition, thereby precluding the occurrence of degradation in startability of the engine 8.

(A4) The alteration on the reactive control of the second electric motor M2 is to extend the time required for second-motor torque (reactive torque) $T_{M2}$ to be generated when degradation occurs in startability of the engine 8 due to the alteration in the fuel type. Therefore, if degradation occurs in startability of the engine 8, the time for rotatably driving the engine 8 for the startup thereof is extended. This allows fuel compressed and expanded in the engine 8 to increase in temperature to the level available to achieve the ignition, thereby precluding the occurrence of degradation in startability of the engine 8.

(A5) The alteration on the reactive control of the second electric motor M2 is to increase the time for second-motor torque (reactive torque) $T_{M2}$ to be generated with a decrease in startability of the engine 8 caused by the alteration in the fuel type. As a consequence, the time required for the engine 8 to be rotatably driven is caused to increase with the decrease in startability of the engine 8. This allows fuel compressed and expanded in the engine 8 to increase in temperature to the level available to achieve the ignition, thereby precluding the occurrence of degradation in startability of the engine 8.

(A6) Depending on the fuel type, used in operating the engine 8, which is determined with the fuel-type alteration determining means 86, the engine rotation speed control is altered to allow the first electric motor M1 to control the engine rotation speed $N_E$ during startup of the engine. Therefore, the engine rotation speed $N_E$, raised by the first electric motor M1 for startup of the engine, can be regulated based on the fuel type. This allows fuel compressed and expanded in the engine 8 to increase in temperature to the level available to achieve the ignition, thereby precluding the occurrence of degradation in startability of the engine 8 resulting from the alteration on the fuel type when the fuel type supplied to the engine 8 is altered.

(A7) The alteration on the engine rotation speed control is to increase the first-motor rotating acceleration $A_{M1}$, representing the variation rate (increasing rate) of the first-motor rotation speed $N_{M1}$ per unit time, when degradation occurs in startability of the engine 8 due to the alteration in the fuel type. Accordingly, if degradation occurs in startability of the engine 8, the first electric motor M1 rotatably drives the engine 8 so as to rapidly increase the engine rotation speed $N_E$. This allows fuel, compressed and expanded in the engine 8, to increase in temperature to the level available to achieve the ignition, thereby precluding the occurrence of degradation in startability of the engine 8.

(A8) The alteration on the engine rotation speed control is to increase the first-motor rotating acceleration $A_{M1}$ with a decrease in startability of the engine 8 due to the alteration on the fuel type. Consequently, as startability of the engine 8 decreases, the first electric motor M1 rotatably drives the engine 8 so as to rapidly increase the engine rotation speed $N_E$. This allows fuel, compressed and expanded in the engine 8, to increase in temperature to the level available to achieve the ignition, thereby precluding the occurrence of degradation in startability of the engine 8.

(A9) The alteration on the engine rotation speed control is to increase the target rotation speed $N_{AM1}$ of the first electric motor M1 when increasing the first-motor rotation speed $N_{M1}$ for startup of the engine in the presence of degradation occurring in startability of the engine 8 due to the alteration on the fuel type. Accordingly, if degradation occurs in startability of the engine 8, the first electric motor M1 rotatably drives the engine 8 to increase the engine rotation speed $N_E$ to a high level corresponding to the target rotation speed $N_{AM1}$. This allows fuel, compressed and expanded in the engine 8, to increase in temperature to the level available to achieve the ignition, thereby precluding the occurrence of degradation in startability of the engine 8.

(A10) The alteration on the engine rotation speed control is to increase the target rotation speed $N_{AM1}$ of the first electric motor M1, when increasing the first-motor rotating speed $N_{M1}$ for startup of the engine, with a decrease in startability of the engine 8 resulting from the alteration on the fuel type. Consequently, if degradation occurs in startability of the engine 8, the first electric motor M1 rotatably drives the engine 8 so as to increase the engine rotation speed $N_E$ to a high level with the decrease in startability of the engine 8. This allows fuel, compressed and expanded in the engine 8, to increase in temperature to the level available to achieve the ignition, thereby suppressing the occurrence of degradation in startability of the engine 8.

(A11) The engine 8 has an output characteristic that varies depending on the fuel type supplied to the engine 8, i.e. the mixing ratio of ethanol. With the present embodiment, engine torque $T_E$ is detected based on first-motor torque $T_{M1}$ acting in opposition to engine torque $T_E$ and the fuel type, i.e. the mixing ratio of ethanol is estimated and determined based on such engine torque $T_E$. Accordingly, detecting first-motor torque $T_{M1}$ allows the fuel type to be easily discriminated.

(A12) When the fuel-supply determining means 80 affirms that fuel in the fuel tank 70 increases, the torque detecting means 82, the fuel-alteration determining means 84, the fuel-type determining means 86 and the engine-startup control means 88 are effectuated. Accordingly, these means are executed depending on needs, resulting in a reduction in control load of the electronic control device 40.

(A13) The present embodiment may be configured such that when detecting the opening of the fueling port lid 74, the fuel-supply control means 80 makes a determination affirming that fuel in the fuel tank 70 increases. In this case, the torque detecting means 82, the fuel-alteration determining means 84, the fuel-type determining means 86 and the engine-startup control means 88 are executed depending on needs, resulting in a reduction in control load of the electronic control device 40.

(A14) The shifting mechanism 10 includes the automatic shifting portion 20 that forms a part of the power transmitting path. Consequently, the shifting mechanism 10 provides a total speed ratio (overall speed ratio) γT as a whole in a wider varying range than that achieved in the absence of such an automatic shifting portion 20, making it possible to obtain favorable fuel economy performance.

(A15) The automatic shifting portion 20 is rendered operative to act as the automatic transmission with a capability of automatically varying a speed ratio. As a consequence, the shifting mechanism 10 can have an automatically variable total speed ratio (overall speed ratio) γT as a whole, resulting in a reduction in load of a driver.

(A16) Since the automatic shifting portion 20 is of the step-variable transmission, the automatic shifting portion 20 allows the speed ratio to vary in an increased varying range, enabling an increase in fuel economy performance.

(A17) The differential portion 11 includes the first and second electric motors M1 and M2 and the differential-portion planetary gear set 24. Thus, the differential portion 11 can be structured such that the differential portion 11 provides output torque with a continuously varying capability upon utilizing the differential action of the differential-portion planetary gear set 24.

(A18) Next, another embodiment according to the present invention will be described below. In the following description, further, component parts common to various embodiment bear like reference numerals to omit redundant description.

<Second Embodiment>

Figure 12:
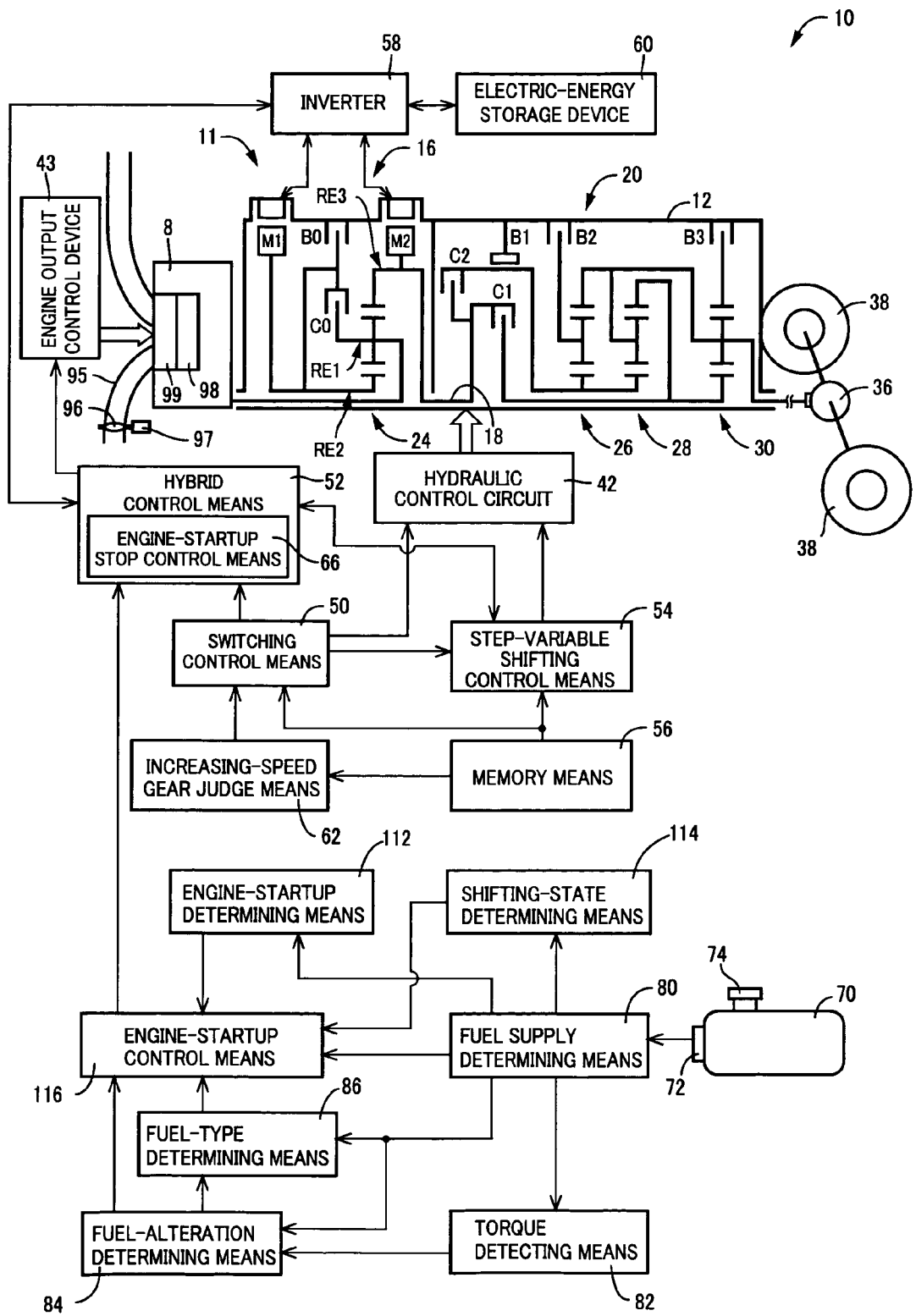
FIG. 12 is a functional block diagram illustrating a major part of a control function to be executed by the electronic control device shown in FIG. 4, which is related to a second embodiment representing an embodiment different from that of FIG. 6.

The second embodiment is related to a structure in which the electronic control device 40 of the first embodiment is replaced by an electronic control device 110. FIG. 12 is a functional block diagram illustrating a major part of a control function to be achieved with the electronic control device 110. In the functional block diagram shown in FIG. 12, the engine-startup control means 88 shown in FIG. 6 is replaced by engine-startup control means 116 and, further, the electronic control device 110 is shown as additionally including engine-startup determining means 112 and shifting-state determining means 114 formed in a structure different from that of FIG. 6. The fuel-supply determining means 80, the torque detecting means 82, the fuel-alteration determining means 84 and the fuel-type determining means 86 have the same structures as those of the component elements of the first embodiment shown in FIG. 6. Hereunder, description will be made with a focus on differing points.

In FIG. 12, the engine-startup determining means 112 makes a query as to whether the electronic control device 110 makes an engine startup determination representing a judgment that the engine 8 needs to be started up in the motor drive mode. If, for instance, the accelerator pedal is deeply depressed, demanded output torque $T_{OUT}$, corresponding to the accelerator-opening Acc, of the automatic shifting portion 20 increases as shown in FIG. 7. In this case, if the vehicle condition varies from the motor drive region to the engine drive region, then the engine startup determination is made.

The shifting-state determining means 114 makes a query as to whether the automatic shifting portion 20 remains under a shifting mode. The query as to whether the automatic shifting portion 20 remains under the shifting mode can be detected by referring to, for instance, a control signal delivered to an electromagnetic valve for controlling a clutch or a brake of the automatic shifting portion 20.

The engine-startup control means 116 alters the reactive control and the engine rotation speed control for startup of the engine based on the fuel type used in operating the engine 8 in the same manner as that achieved by the engine-startup control means 88 shown in FIG. 6.

Further, if the engine-startup determining means 112 makes a determination affirming that the engine startup determination is made, the engine-startup control means 116 alters the reactive control and the engine rotation speed control based on the fuel type and subsequently executes a control to start up the engine 8. The engine-startup control means 116 executes the control to start up the engine 8 in different startup methods depending on whether the automatic shifting portion 20 remains under the non-shifting mode or the shifting mode.

A method of starting up the engine 8 will be described below in detail. If the engine-startup determining means 112 affirms that the engine startup determination is made, the shifting-state determining means 114 determines that the automatic shifting portion 20 remains under the non-shifting mode. In this case, the engine-startup control means 116 alters the reactive control and the engine rotation speed control based on the fuel type and subsequently executes the control to start up the engine 8. The engine-startup control means 116 determines to allow the reactive control of the second electric motor M2 to be executed for the automatic shifting portion 20 remaining under the non-shifting mode. However, the engine-startup control means 116 alters the reactive control based on the fuel type.

Under the non-shifting mode, no power transmitting path is interrupted between the second electric motor M2 and the drive wheels 38. In this case, the engine-startup control means 116 varies the first-motor rotation speed $N_{M1}$ while permitting the second-motor rotation speed $N_{M2}$, bound with the vehicle speed V (indicative of a velocity of one drive wheel 38) provided that the vehicle speed V remains constant, to be kept at a fixed level. In particular, the first-motor rotation speed $N_{M1}$ is caused to increase in the same rotational direction as that of the second electric motor M2. This allows the engine rotation speed $N_E$ for startup of the engine to increase in the same rotational direction as that, in which the first and second electric motors M1 and M2 rotate, up to a level higher than the engine startup rotation speed NE1 available to initiate the startup of the engine.

When this takes place, the first-motor rotation speed $N_{M1}$ is caused to increase in the presence of first-motor torque $T_{M1}$. In this case, rotational resistance of the engine 8 acts in a direction to lower the second-motor rotation speed $N_{M2}$ representing the input rotation speed of the automatic shifting portion 20. Thus, in performing the reactive control of the second electric motor M2, the second-motor rotation speed $N_{M2}$ is maintained, with an accompanying further increase in second-motor torque $T_{M2}$ than that achieved when no engine startup is initiated.

Further, during the non-shifting mode of the automatic shifting portion 20, no power transmitting path is interrupted and the reverse drive force delivered from the drive wheels 38 is utilized for increasing the engine rotation speed $N_E$ for startup of the engine. As a consequence, during the execution of the reactive control of the second electric motor M2, combined reactive torques composed of the reverse drive force delivered from the drive wheels 38 and second-motor torque $T_{M2}$, counteract rotational resistance of the engine 8. Thus, second-motor torque $T_{M2}$ for the non-shifting mode of the automatic shifting portion 20 becomes less than second-motor torque $T_{M2}$, acting as reactive torque in opposition to rotational resistance of the engine 8, which is attained for the shifting mode of the automatic shifting portion 20.

Basically, furthermore, second-motor torque $T_{M2}$ is caused to increase to be greater than that achieved when no operation is executed to initiate the engine startup with a view to counteracting rotational resistance of the engine 8. Under a circumstance where, for instance, almost no adverse affect occurs on a running state of the vehicle even if no second-motor torque $T_{M2}$ is caused to increase, i.e. when the reverse drive force delivered from the drive wheels 38 is extremely greater than rotational resistance of the engine 8, no second-motor torque $T_{M2}$ needs to increase. That is, no second electric motor M2 may be used for startup of the engine but the first electric motor M1 may be used to increase the engine rotation speed $N_E$ for startup of the engine.

Further, the engine-startup determining means 112 makes a determination affirming that the engine startup determination is made. In this case, if the shifting-state determining means 114 makes a determination that the automatic shifting portion 20 remains under the shifting state, then the engine-startup control means 116 determines executing the reactive control of the second electric motor M2 for the shifting mode of the automatic shifting portion 20. In addition, the engine-startup control means 116 increases the engine rotation speed $N_E$ for startup of the engine upon using both the first and second electric motors M1 and M2. However, the engine-startup control means 116 alters such a reactive control depending on the type fuel.

More particularly, for startup of the engine with the automatic shifting portion 20 executing the shifting in a downshift mode, the engine-startup control means 116 controls second-motor torque $T_{M2}$ in accordance with the reactive control altered based on the fuel type. This allows the second-motor rotation speed $N_{M2}$, representing the input rotation speed of the automatic shifting portion 20, to vary such that the automatic shifting portion 20 establishes the shifting (in downshift). That is, with the second-motor rotation speed $N_{M2}$ incremented, first-motor torque $T_{M1}$ is controlled to vary the first-motor rotation speed $N_{M1}$. That is, the first-motor rotation speed $N_{M1}$ is caused to increase in the same rotational direction as that of the second electric motor M2. This allows the engine rotation speed $N_E$ for startup of the engine to increase in the same direction as those of the first and second motors M1 and M2 to a level beyond the engine startup rotation speed NE1 available to initiate the engine startup.

Further, for startup of the engine during the shifting of the automatic shifting portion 20 in an upshift mode, the engine-startup control means 116 controls second-motor torque $T_{M2}$ in accordance with the reactive control altered based on the fuel type. This allows the second-motor rotation speed $N_{M2}$, representing the input rotation speed of the automatic shifting portion 20, to vary such that the automatic shifting portion 20 establishes the shifting (in upshift). That is, the second-motor rotation speed $N_{M2}$ is lowered with first-motor torque $T_{M1}$ being controlled to vary the first-motor rotation speed $N_{M1}$. That is, the first-motor rotation speed $N_{M1}$ is caused to increase in the same rotational direction as that of the second electric motor M2. This allows the engine rotation speed $N_E$ for startup of the engine to increase in the same rotational direction as those of the first and second motors M1 and M2 to a level beyond the engine startup rotation speed NE1 available to initiate the engine startup.

Even under the automatic shifting portion 20 remains in either the upshift mode or the downshift mode, the engagement and the disengagement of the clutch or the brake are progressively effectuated at the same time due to such a shifting operation. Thus, no power transmitting path is brought into a completely connected state between the second electric motor M2 and the drive wheels 38 with an accompanying difficulty of utilizing the reverse drive force delivered from the drive wheels 38. Accordingly, when the automatic shifting portion 20 is under the shifting mode (in either the downshift mode or the upshift mode), the engine-startup control means 116 executes the reactive control of the second electric motor M2. In this moment, second-motor torque $T_{M2}$, acting as reactive torque in opposition to rotational resistance of the engine 8, is caused to increase to be greater than that achieved when the automatic shifting portion 20 remains under the non-shifting mode.

Even under a circumstance where the automatic shifting portion 20 remains in either the shifting mode or the non-shifting mode, first-motor torque $T_{M1}$ and second-motor torque $T_{M2}$ for startup of the engine are determined based on a result of experimental tests conducted in light of fluctuation in rotational resistance of the engine 8.

Furthermore, even under the circumstance where the automatic shifting portion 20 remains in either the shifting mode or the non-shifting mode, if the engine rotation speed $N_E$ for startup of the engine is caused to increase, the engine-startup control means 116 starts up the engine 8, i.e. the engine ignition is initiated, when the engine rotation speed $N_E$ becomes higher than the engine startup rotation speed NE1.

Moreover, the engine ignition may be initiated during the shifting operation of the automatic shifting portion 20 at timing in any of phases before and after an ending time period of such a shifting operation. However, if the timing of the engine ignition and the ending time period of the shifting operation overlap each other, i.e. when a time difference between both of these timings exists within a given time interval, there is a risk of causing a shock in engine startup and a shifting shock to occur in an overlapping phase. Thus, a vehicle occupant encounters a tendency with a feeling in an increasing shock. Therefore, the engine ignition timing may be determined so as to avoid such a defective feeling.

Further, although the engine-startup control means 116 preliminarily stores the engine startup rotation speed NE1, the engine startup rotation speed NE1 may be a constant number or may be altered depending on the fuel type. The engine-startup control means 116 may set the engine startup rotation speed NE1 at a high level depending on the fuel type, i.e. the mixing ratio of ethanol such that the lower the startability of the engine, the higher will be the target rotation speed $NA_{M1}$.

Figure 13:
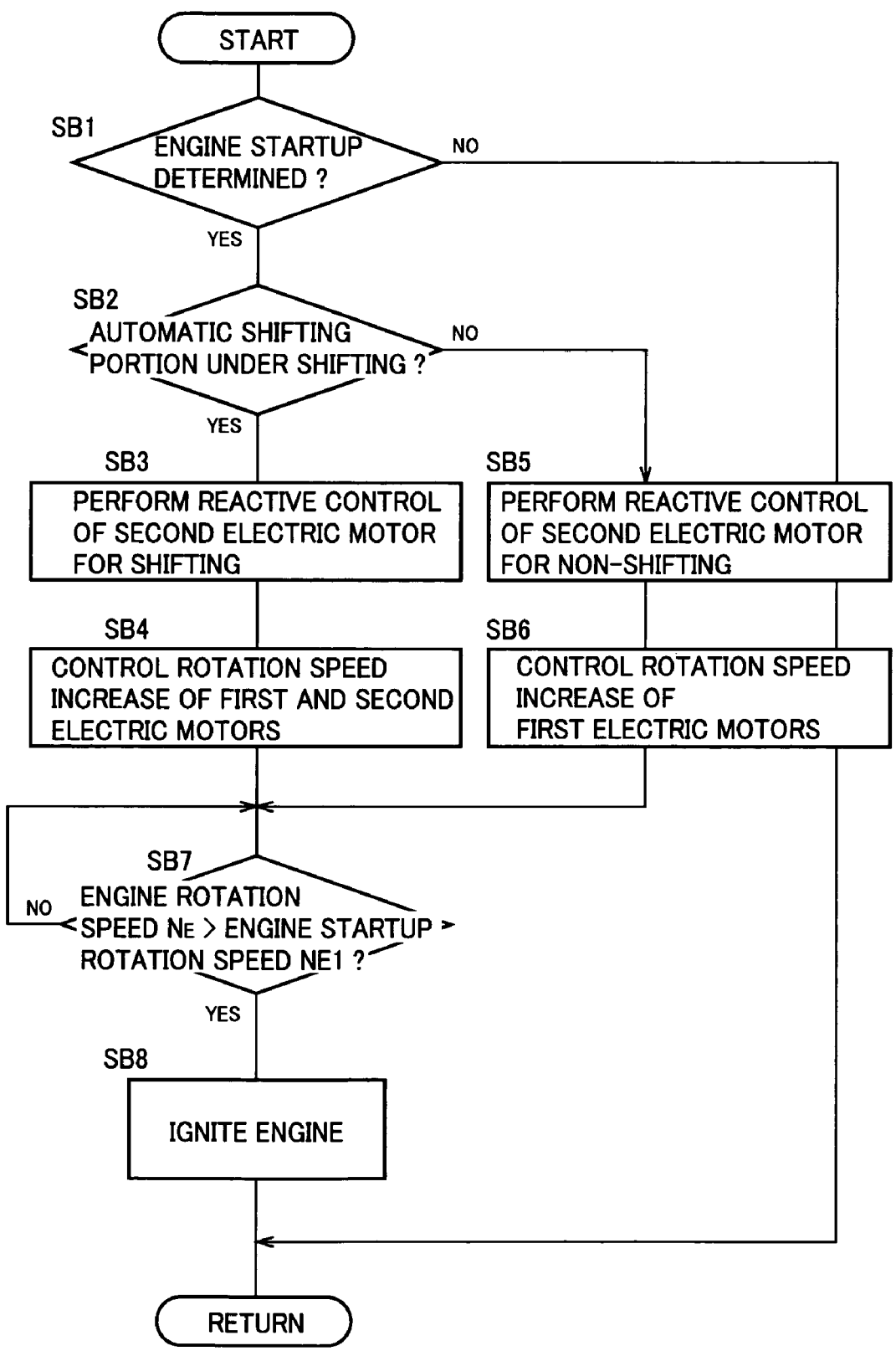
FIG. 13 is a flow chart, illustrating a basic sequence of major control operations, i.e., control operations to be executed with the electronic control device shown in FIG. 4 for suppressing the occurrence of degradation in startability of the engine when ethanol is blended to fuel, which is related to the second embodiment representing the embodiment different from that of FIG. 10.

FIG. 13 is a flow chart illustrating a major part of control operations to be executed with the electronic control device 110, i.e. control operations to be executed for suppressing the occurrence of degradation in startability of the engine 8 when ethanol is mixed to fuel. The control operations are executed for an extremely short period of time in the order of, for instance, several milliseconds or several tens milliseconds.

First, at step (hereinafter the term "step" is omitted) SB1 corresponding to the engine-startup determining means 112, a query is made as to whether the engine startup determination is made during the motor drive mode. If, for instance, the accelerator pedal is deeply depressed with an accompanying increase in demanded output torque $T_{OUT}$ of the automatic shifting portion 20 corresponding to the accelerator-opening Acc as shown in FIG. 7, the vehicle condition is shifted from the motor drive region to the engine drive region upon which the engine startup determination is made.

If the answer to this determination is YES, i.e. when the engine startup determination is made, a need arises to start up the engine 8 and the control routine goes to SB2. If, on the other hand, the answer is NO, then the control operations, shown in the flow chart in FIG. 13, are completed.

At SB2 corresponding to the shifting-state determining means 114, a query is made as to whether the automatic shifting portion 20 remains in the shifting mode. If the answer is YES, i.e. when the automatic shifting portion 20 remains in the shifting mode, then the control routine proceeds to SB3. If, on the other hand, the answer is NO, then the control routine goes to SB5.

At SB3, a determination is made to perform the reactive control of the second electric motor M2 for the automatic shifting portion 20 remaining under the shifting mode. However, this reactive control is altered depending on the fuel type.

At SB4 subsequent to SB3, the second-motor rotation speed $N_{M2}$, representing the input rotation speed of the automatic shifting portion 20, is caused to vary such that the shifting is established in the automatic shifting portion 20 and the first-motor rotation speed $N_{M1}$ for startup of the engine is caused to increase in the same rotation direction as that of the second electric motor M2. This causes the engine rotation speed $N_E$ for startup of the engine to increase in the same rotational direction as that in which the first and second electric motors M1 and M2 rotate to a level beyond the engine startup rotation speed NE1 available to initiate the startup of the engine.

Further, even if the automatic shifting portion 20 is under the upshift mode or the downshift mode during the shifting, the engagement and the disengagement of the clutch or the brake are progressively completed at the same time due to such a shifting operation. In this case, no power transmitting path is completely established between the second electric motor M2 and the drive wheels 38. Thus, no reverse drive force is transferred from the drive wheels 38 to the engine 8. Therefore, during the reactive control of the second electric motor M2, second-motor torque $T_{M2}$, acting as reactive torque in opposition to rotational resistance of the engine 8 during the shifting of the automatic shifting portion 20, is caused to increase to a level greater than that achieved when the automatic shifting portion 20 is under the non-shifting mode.

At SB5, a determination is made to perform the reactive control of the second electric motor M2 for the automatic shifting portion 20 remaining under the non-shifting mode. However, the reactive control is altered depending on the fuel type.

At SB6 subsequent to SB5, since the automatic shifting portion 20 is under the non-shifting mode, the second-motor rotation speed $N_{M2}$, bound with the vehicle speed (indicative of a velocity of one drive wheel 38), is kept constant provided that the vehicle speed V remains constant and the first-motor rotation speed $N_{M1}$ is caused to increase in the same rotational direction as that that of the second electric motor M2. This causes the engine rotation speed $N_E$ for startup of the engine to increase in the same rotational direction as those of the first and second electric motors M1 and M2 to a level beyond the engine startup rotation speed NE1 available to initiate the startup of the engine.

When this takes place, first-motor torque $T_{M1}$ causes the first-motor rotation speed $N_{M1}$ to increase. In this moment, rotational resistance of the engine 8 acts in a direction to lower the second-motor rotation speed $N_{M2}$ representing the input rotation speed of the automatic shifting portion 20. Consequently, during the reactive control of the second electric motor M2, the second-motor rotation speed $N_{M2}$ is maintained and, hence, second-motor torque $T_{M2}$ is caused to increase to a level greater than that appearing when no engine startup is initiated. In addition, even if the automatic shifting portion is under the shifting mode or the non-shifting mode, first-motor torque $T_{M1}$ and second-motor torque $T_{M2}$ are determined based on a result on experimental tests conducted in consideration of fluctuation in rotational resistance of the engine 8.

If SB4 or SB6 are executed, the control routine goes to SB7 at which a query is made as to whether the engine rotation speed $N_E$ is higher than the engine startup rotation speed NE1. If the answer is YES, i.e. when the engine rotation speed $N_E$ is higher than the engine startup rotation speed NE1, the control routine proceeds to SB8. If, on the other hand, the answer is NO, then SB7 is executed again. That is, the increase in the engine rotation speed $N_E$, resulting from the execution at SB4 or SB6, is caused to continue until the engine rotation speed $N_E$ becomes higher than the engine startup rotation speed NE1. In this case, if the engine rotation speed $N_E$ becomes higher than the engine startup rotation speed NE1, then the control routine proceeds to SB8.

At SB8, the engine ignition is initiated to start up the engine 8. Also, SB 3 to SB 8 collectively correspond to the engine-startup determining means 116.

FIG. 14 is a timing chart, illustrating the control operations indicated in the flow chart of FIG. 13, which represents an exemplary case wherein the accelerator pedal is depressed during the motor drive mode and the engine startup determination is made during the downshift mode of the automatic shifting portion 20. FIG. 14 shows the timing chart plotted with, from the top on down, the engine rotation speed $N_E$, the input rotation speed of the automatic shifting portion 20, the second-motor rotation speed $N_{M2}$, the first-motor rotation speed $N_{M1}$, the accelerator-opening Acc and reactive torque of the second electric motor M2. In the illustrated embodiment, the input rotation speed of the automatic shifting portion 20 and the second-motor rotation speed $N_{M2}$ are equal to each other.

In FIG. 14, time $t_{B1}$ indicates that a shift determination is made representing a judgment as to whether the electronic control device 110 needs to execute the shifting in the automatic shifting portion 20 based on the shifting map shown in FIG. 7.

Time $t_{B2}$ indicates that a shifting output is delivered to the control circuit 42 for commanding the automatic shifting portion 20 to execute the shifting.

Upon receipt of this shifting output, the automatic shifting portion 20 begins the shifting at time $t_{B2}$ and the second-motor rotation speed $N_{M2}$, i.e. the input rotation speed of the automatic shifting portion 20, is raised so as to allow the automatic shifting portion 20 to establish the downshift. In addition, at time $t_{B2}$, the engine 8 is not rotating due to own rotational resistance. Therefore, due to an increase in the second-motor rotation speed $N_{M2}$ and the differential action of the power distributing mechanism, the first electric motor M1, remaining in a free-wheeling state, increases the first-motor rotation speed $N_{M1}$ at time $t_{B2}$ in a direction opposite to that of the second electric motor M2.

Time $t_{B3}$ indicates that the accelerator pedal is depressed, i.e. the accelerator-opening Acc is caused to increase. With such an increase in the accelerator-opening Acc, the vehicle condition shifts from the motor drive region to the engine drive region as shown in FIG. 7, upon which the electronic control device 110 makes the engine startup determination. Then, the positive determination is made at SB1 in FIG. 13 and the determination is made at SB2 in FIG. 13 affirming that the automatic shifting portion 20 is under the shifting operation. This cases the first-motor rotation speed $N_{M1}$ to be raised at time $t_{B3}$ in FIG. 14 in the same rotational direction as that of the second electric motor M2, with an accompanying increase in the engine rotation speed $N_E$ for startup of the engine.

With the increase in the engine rotation speed $N_E$ at time $t_{B3}$, rotational resistance of the engine 8 acts in a direction to lower the second-motor rotation speed $N_{M2}$, resulting in an increase in second-motor torque (reactive torque) $T_{M2}$ at time $t_{B3}$ to counteract rotational resistance of the engine 8.

Time $t_{B4}$ indicates that with no alteration made in the fuel type, i.e. when fuel is gasoline with no ethanol being mixed, the engine 8 is ignited and the engine 8 achieves a complete combustion. That is, this represents that that the engine rotation speed $N_E$ reaches the engine startup rotation speed NE1 upon which a positive determination is made at SB7 in FIG. 13 and the engine ignition is initiated at SB8 in FIG. 13. Accordingly, at time $t_{B4}$ and later, no need arises to counteract rotational resistance of the engine 8 and second-motor torque (reactive torque) $T_{M2}$, indicated by a solid line in FIG. 14, is returned to the same level as that achieved before it is raised.

In FIG. 14, time $t_{B5}$ indicates that under a circumstance where the fuel type is altered to ethanol blend fuel, SB8 in FIG. 13 is executed to ignite the engine 8 and the engine 8 achieves the complete combustion. Accordingly, at time $t_{B5}$ and later, second-motor torque (reactive torque) $T_{M2}$ indicated by a single dot line in FIG. 14 is returned to the same level as that achieved before it is raised.

Thus, since fuel is altered to ethanol blend fuel and degradation occurs in startability of the engine 8 due to the alteration of the fuel type, the operations are executed to alter the reactive control and the engine rotation speed control. The time, needed for increasing second-motor torque (reactive torque) $T_{M2}$ for startup of the engine 8, is extended from time $t_{B4}$ to time $t_{B5}$. As a result, second-motor torque (reactive torque) $T_{M2}$ is increased to be greater than torque (indicated by a solid line), appearing when no fuel type is altered, as indicated in a double dot line.

The first-motor rotating acceleration $A_{M1}$, representing a variation rate (increment rate) of the first-motor rotation speed $N_{M1}$ per unit time as indicated by a single dot line, becomes greater than that (indicated by a solid line) when no fuel type is altered. The target rotation speed $N_{AM1}$ of the first electric motor M1, corresponding to the first-motor rotation speed $N_{M1}$ for complete combustion of the engine, becomes greater than that (indicated by a solid line) when no fuel type is altered. Upon comparison between the engine rotation speeds $N_E$ for complete combustion of the engine, i.e. between the engine rotation speed $N_E$ at time $t_{B4}$ and the engine rotation speed $N_E$ at time $t_{B5}$, the engine rotation speed $N_E$ at time $t_{B5}$ is higher than the engine rotation speed $N_E$ at time $t_{B4}$. Thus, it will be understood that when the fuel type is altered, the engine startup rotation speed NE1 is set at a higher level.

Time $t_{B6}$ indicates that the shifting is completed in the automatic shifting portion 20. Accordingly, at time $t_{B6}$ and later, the automatic shifting portion 20 is brought into the non-shifting state. In this moment, at time $t_{B6}$ and later, the second-motor rotation speed $N_{M2}$, i.e. the input rotation speed of the automatic shifting portion 20 is kept constant in line with the vehicle speed V. In addition, with the second-motor rotation speed $N_{M2}$ kept constant, the engine rotation speeds $N_E$ and the first-motor rotation speed $N_{M1}$ are kept constant at time $t_{B6}$ and later. Moreover, to avoid the overlapping between the shifting shock and the engine startup shock caused by the completion in shifting of the automatic shifting portion 20, an engine startup timing may be determined such that a time difference between time $t_{B4}$ or time $t_{B5}$, representing the complete combustion of the engine, and time $t_{B6}$ representing the end of the shifting, is greater than a given time interval.

The electronic control device 110 of the present embodiment has, in addition to the advantageous effects (A1) to (A17) of the first embodiment mentioned above, the other advantageous effects (B1) and (B2) as listed below.

(B1) During the shifting of the automatic shifting portion 20, the engine rotation speed $N_E$ for startup of the engine 8 is caused to increase using both the first and second electric motors M1 and M2. As a consequence, the engine rotation speed $N_E$ for startup of the engine 8 can be increased during the shifting of the automatic shifting portion 20. This enables the startup of the engine 8 to be promptly initiated, thereby providing improved response to acceleration requirement of a driver.

When increasing the engine rotation speed $N_E$ for startup of the engine 8, second-motor torque $T_{M2}$ for startup of the engine 8 for the shifting mode of the automatic shifting portion 20 is made greater than second-motor torque $T_{M2}$ for the automatic shifting portion 20 remaining under the non-shifting mode. Accordingly, the startup operation of the engine 8 can be precluded from adversely affecting the shifting operation of the automatic shifting portion 20.

While the present invention has been described above with reference to the embodiments shown in the accompanying drawings, it will be appreciated that the embodiments described be considered only as illustrative of the present invention and that those skilled in the art will be able to implement the present invention in various modifications and improvements.

For instance, in the first and second embodiments, the engine-startup control means 88 and 116 may be configured to alter the reactive control and the engine rotation speed control for startup of the engine when a temperature, detected as a temperature of coolant liquid, of the engine 8 is less than a given engine temperature determining value. As used herein, the term "engine temperature determining value" refers to a threshold value that is preliminarily obtained on experimental tests and stored in the engine-startup control means 88 and 116. In other words, this represents a threshold value enabling a determination to be made that degradation occurs in startability of the engine 8 to a level less than a lower limit value.

The engine temperature determining value may be altered depending on the fuel type in use. For instance, if gasoline has an increased ethanol mixing ratio, degradation occurs in startability of the engine 8. Therefore, the engine temperature determining value may be set such that the higher the ethanol mixing ratio, the lower will be the engine temperature determining value. Such an altered engine temperature determining value enables the suppression of a drop in startability of the engine 8 during a cold state susceptible to a drop in startability of the engine 8.

In the first and second embodiments, further, the engine-startup control means 88 and 116 may be configured to execute the alteration on the reactive control and the alteration on the engine rotation speed control for startup of the engine during the shifting operation of the automatic shifting portion 20. The engine-startup control means 88 and 116 may be arranged not to execute the alteration on the reactive control and the alteration on the engine rotation speed control for startup of the engine during the non-shifting mode of the automatic shifting portion 20. In another alternative, the engine-startup control means 88 and 116 may be arranged to execute the alteration on the reactive control and the alteration on the engine rotation speed control at respective varying rates. That is, for instance, a cranking time interval for the engine 8 and an increment rate of reactive torque may be set to be less than those set for the shifting state of the automatic shifting portion 20.

In the first and second embodiments, still further, the engine-startup control means 88 and 116 may be configured to execute the alteration on the reactive control and the alteration on the engine rotation speed control for startup of the engine during the neutral state of the automatic shifting portion 20.

In the first and second embodiments, furthermore, the engine-startup control means 88 alters the reactive control and the engine rotation speed control when the fuel-alteration determining means 84 makes a positive determination. The engine-startup control means 88 alters the reactive control and the engine rotation speed control for startup of the engine depending on the fuel type in use. Such alterations may be executed regardless of the determination of the fuel-alteration determining means 84.

While the first and second embodiments have been described above with reference to an exemplary case wherein ethanol is mixed to gasoline fuel supplied to the engine 8, fuel may be of a type having a principal component of, for instance, light oil or hydrogen. Further, since the fuel type is not limited to ethanol blend fuel, the fuel-type determining means 86 may have a function not only to estimate the mixing ratio of ethanol but also to estimate the fuel type for determination.

In the first and second embodiments, while both the first and second electric motors M1 and M2 are provided in the differential portion 11, they can be provided in the shifting mechanism 10 independent from the differential portion 11.

In the first and second embodiments, while the shifting mechanism 10 has been described above with reference to the structure in which the engine 8 and the differential portion are directly connected to each other, it may suffice for the engine 8 to be connected to the differential portion 11 via a clutch engaging element such as a clutch.

In the first and second embodiments, the differential portion 11 has been described above as having the function to operate as the electrically controlled continuously variable transmission with the speed ratio $\gamma 0$ enabled to continuously vary in the value ranging from the minimum value $\gamma 0\text{min}$ to the maximum value $\gamma 0\text{max}$, it may suffice for, for instance, the speed ratio $\gamma 0$ of the differential portion 11 not to be continuously varied but to be varied step-by-step upon daringly utilizing the differential action.

In the shifting mechanism 10 of the first and second embodiments, the first electric motors M1 and the second rotary element RE2 are directly connected, and the second electric motors M2 and the third rotary element RE3 are directly connected. However, the first electric motors M1 can be connected to the second rotary element RE2 via an engaging element such as a clutch, and the second electric motors M2 can be connected to the third rotary element RE3 via an engaging element such as a clutch.

In the first and second embodiments, the automatic shifting portion 20 is connected to the power transmitting path extending from the engine 8 to the drive wheels 38 at a position next to the differential portion 11, but the differential portion 11 may be connected in sequence to the output of the automatic shifting portion 20. In summary, the automatic shifting portion 20 is sufficiently disposed to construct a part of the power transmitting path extending from the engine 8 to the drive wheel 38.

In the first and second embodiments, while the differential portion 11 and the automatic shifting portion 20 are connected to each other in series in the structure shown FIG. 1, the present invention can be applied to a structure even if the differential portion 11 and the automatic shifting portion 20 are mechanically independent from each other provided that a whole of the shifting mechanism 10 has a function to achieve an electrically controlled differential action enabling a differential state to be electrically varied and a function to perform a shifting on a principle different from the function of the electrically controlled differential action.

In the first and second embodiments, the various embodiments have been described above with reference to the structure wherein the engine 8 is connected to the first rotary element RE1 of the differential-portion planetary gear unit 24 for drive-force transmitting capability and the first electric motor M2 is connected to the second rotary element RE2 for drive-force transmitting capability while the power transmitting path for the drive wheels 38 is connected to the third rotary element RE3. However, the present invention may be applied to such a structure including, for instance, two planetary gear units wherein partial rotary elements, forming such planetary gear units, are connected to each other. With such a structure, an engine, an electric motor and drive wheels are connected to the rotary elements of the planetary gear units for drive-force transmitting capability such that a clutch or a brake, connected to the rotary elements of the planetary gear units, can be controlled to switch a shifting mode between a step-variable shifting mode and a continuously variable shifting mode.

In the first and second embodiments, while the power distributing mechanism 16 is described as of the single planetary type, it may be of a doubled planetary type.

While the automatic shifting portion 20 is described above as having a function to serve as the step-variable automatic transmission, it may include an infinitely variable CVT or a shifting portion that functions as a manually operated transmission.

In the first and second embodiments, while the second electric motor M2 is directly connected to the power transmitting member 18, it can be connected in other mode. That is, the second electric motor M2 can be sufficiently connected to the power transmitting path extending from the engine 8 or the power transmitting member 18 to the drive wheel 38, directly or indirectly via the transmission, the planetary gear unit, the engaging device etc.

In the power distribution mechanisms 16 of the first and second embodiments, the differential-portion carrier CA0 is connected to the engine 8; the differential-portion sun gear S0 is connected to the first electric motor M1; and the differential-portion ring gear R0 is connected to the power transmitting member 18. However, the present invention is not necessarily limited to such connecting arrangement, and the engine 8, first electric motor M1 and power transmitting member 18 have no objection to be connected to either one of the three elements CA0, S0 and R0 of the first planetary gear set 24.

In the first and second embodiments, while the engine 8 is directly connected to the input shaft 14, it may be sufficiently operatively connected via, for instance, gears, belts or the like. No need may arise for the engine 8 and the input shaft 14 to be necessarily disposed on a common axis.

In the first and second embodiments, with the first electric motor M1 and the second electric motor M2 disposed coaxially with the input shaft 14, the first electric motor M1 is connected to the differential-portion sun gear S0 and the second electric motor M2 is connected to the power transmitting member 18. However, no need arises for these component parts to be necessarily placed in such connecting arrangement. For example, the first electric motor M1 may be connected to the differential-portion sun gear S0 through gears, a belt or the like, and the second electric motor M2 may be connected to the power transmitting member 18.

In the first and second embodiments, while the automatic transmission portion 20 is connected to the differential portion 11 in series via the power transmitting member 18, a countershaft may be provided in parallel to the input shaft 14 to allow the automatic transmission portion 20 to be coaxially disposed on an axis of the countershaft. In this case, the differential portion 11 and the automatic transmission portion 20 may be connected to each other in power transmissive state via a set of transmitting members structured of, for instance, a counter-gear pair acting as the power transmitting member 18, a sprocket and a chain.

In the first and second embodiments, while the power distributing mechanism 16 is described above as including one set of planetary gear units, it include two or more sets of planetary gear units that are arranged to function as a transmission having three or more speed positions under a non-differential state (fixed shifting state).

In the first and second embodiments, the second electric motor M2 is connected to the power transmitting member 18 forming the part of the power transmitting path extending from the engine 8 to the drive wheel 38. However, the second electric motor M2 connected to the power transmitting path can be connected to the power distributing mechanism 16 via the engaging element such as the clutch. Therefore, instead for the first electric motor M1, the second electric motor M2 can be used to control the differential state of the power distributing mechanism 16 for the shifting mechanism 10.

The first and second embodiments may be implemented in a mutually combined form upon providing, for instance, a priority order.

The invention claimed is:

1. A control device for a hybrid vehicle power transmitting apparatus,
the hybrid vehicle power transmitting apparatus comprising (i) an electrically controlled differential portion including a differential mechanism connected between an engine and drive wheels, and a first electric motor connected to the differential mechanism in a power transmissive state, a differential state of the differential mechanism being controlled upon controlling an operating state of the first electric motor, and (ii) a second electric motor connected to a power transmitting path;

the control device performing an alteration on a reactive control, representing an operation to control reactive torque of the second electric motor in opposition to rotational resistance of the engine during startup of the engine, based on a fuel type used in operating the engine.

2. The control device for the hybrid vehicle power transmitting apparatus according to claim 1, wherein the alteration on the reactive control is to increase the reactive torque of the second electric motor when degradation occurs in startability of the engine.

3. The control device for the hybrid vehicle power transmitting apparatus according to claim 1, wherein the alteration on the reactive control is to extend a time for the reactive torque of the second electric motor to be generated when degradation occurs in startability of the engine.

4. The control device for the hybrid vehicle power transmitting apparatus according to claim 1, wherein the alteration on the reactive control is executed when a temperature of the engine is lower than a given value.

5. The control device for the hybrid vehicle power transmitting apparatus according to claim 1, wherein the hybrid vehicle power transmitting apparatus includes a shifting portion forming part of the power transmitting path, the alteration on the reactive control being executed during a shifting operation of the shifting portion.

6. The control device for the hybrid vehicle power transmitting apparatus according to claim 1, wherein output torque of the engine is detected based on reactive torque of the first electric motor counteracting an output torque of the engine, based on which the fuel type is discriminated.

7. The control device for the hybrid vehicle power transmitting apparatus according to claim 1, wherein the fuel type is discriminated when fuel in a fuel tank mounted on a vehicle increases.

8. The control device for the hybrid vehicle power transmitting apparatus according to claim 1, wherein the fuel type is discriminated when detecting an opening of a lid for fueling port of a fuel tank mounted on a vehicle.

9. The control device for the hybrid vehicle power transmitting apparatus according to claim 1, wherein the hybrid vehicle power transmitting apparatus includes a shifting portion forming part of the power transmitting path.

10. The control device for the hybrid vehicle power transmitting apparatus according to claim 5, wherein the shifting portion is rendered operative to function as an automatic transmission with a speed ratio being automatically varied.

11. The control device for the hybrid vehicle power transmitting apparatus according to claim 5, wherein the shifting portion includes a step-variable transmission.

12. The control device for the hybrid vehicle power transmitting apparatus according to claim 1, wherein the electrically controlled differential portion includes more than two electric motors, composed of the first electric motor and second electric motor, and a planetary gear set.

13. The control device for the hybrid vehicle power transmitting apparatus according to claim 1, wherein the fuel type is discriminated by detecting an output torque of the engine based on reactive force of the first electric motor and rotating acceleration of the first electric motor.

14. The control device for the hybrid vehicle power transmitting apparatus according to claim 1, wherein the hybrid vehicle power transmitting apparatus includes a shifting portion forming part of the power transmission path. The alteration on the reactive control being executed during a neutral state of the shifting portion.

15. A control device for a hybrid vehicle power transmitting apparatus, the hybrid vehicle power transmitting apparatus comprising (i) an electrically controlled differential portion including a differential mechanism connected between an engine and drive wheels, and a first electric motor connected to the differential mechanism in a power transmissive state, a differential state of the differential mechanism being controlled upon controlling an operating state of the first electric motor, and (ii) a second electric motor connected to a power transmitting path;

the control device being operative to alter an engine rotation speed control representing an operation of the first electric motor to control an engine rotation speed during startup of the engine, based on a fuel type used in operating the engine, wherein the alteration on the engine rotation speed control is to increase a variation rate of a rotation speed of the first electric motor per unit time upon degradation occurrence in startability of the engine.

16. The control device for the hybrid vehicle power transmitting apparatus according to claim 15, wherein the alteration on the engine rotation speed control is executed when the temperature of the engine is lower than the given value.

17. The control device for the hybrid vehicle power transmitting apparatus according to claim 15, wherein the hybrid vehicle power transmitting apparatus includes a shifting portion forming part of the power transmitting path, the alteration on the engine rotation speed control being executed during a shifting operation of the shifting portion.

18. The control device for the hybrid vehicle power transmitting apparatus according to claim 15, wherein the hybrid vehicle power transmitting apparatus includes a shifting portion forming part of the power transmitting path, the alteration on the engine rotation speed control being executed during a neutral state of the shifting portion.

19. A control device for a hybrid vehicle power transmitting apparatus, the hybrid vehicle power transmitting apparatus comprising (i) an electrically controlled differential portion including a differential mechanism connected between an engine and drive wheels, and a first electric motor connected to the differential mechanism in a power transmissive state, a differential state of the differential mechanism being controlled upon controlling an operating state of the first electric motor, and (ii) a second electric motor connected to a power transmitting path;

the control device being operative to alter an engine rotation speed control representing an operation of the first electric motor to control an engine rotation speed during startup of the engine, based on a fuel type used in operating the engine, wherein the alteration on the engine rotation speed control is to increase a target rotation speed of the first electric motor for increasing the rotation speed of the first electric motor for startup of the engine upon degradation occurrence in startability of the engine.

* * * * *